United States Patent
Yerramalli et al.

(10) Patent No.: US 10,506,603 B2
(45) Date of Patent: Dec. 10, 2019

(54) POWER CONTROL, REPORTING TECHNIQUES, AND CONTROL CHANNEL CONFIGURATION IN UNLICENSED SPECTRUM AND LICENSED ASSISTED ACCESS

(71) Applicant: QUALCOMM Incorporated, San Diego, CA (US)

(72) Inventors: Srinivas Yerramalli, San Diego, CA (US); Peter Gaal, San Diego, CA (US); Wanshi Chen, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 77 days.

(21) Appl. No.: 15/698,468

(22) Filed: Sep. 7, 2017

(65) Prior Publication Data
US 2018/0132245 A1 May 10, 2018

Related U.S. Application Data

(60) Provisional application No. 62/418,112, filed on Nov. 4, 2016.

(51) Int. Cl.
*H04J 3/16* (2006.01)
*H04W 72/04* (2009.01)
(Continued)

(52) U.S. Cl.
CPC ..... *H04W 72/0473* (2013.01); *H04W 52/146* (2013.01); *H04W 52/221* (2013.01);
(Continued)

(58) Field of Classification Search
CPC ............... H04W 72/14; H04W 72/042; H04W 72/0413; H04W 72/12; H04W 72/0473;
(Continued)

(56) References Cited

U.S. PATENT DOCUMENTS 8,565,128 B2 * 10/2013 Guo ................. H04L 1/1848
370/305
9,030,977 B2 * 5/2015 Chen ............... H04B 7/15542
370/310
(Continued)

FOREIGN PATENT DOCUMENTS

WO WO-2015141584 A1 9/2015
WO WO-2015179055 A1 11/2015
WO WO-2016122254 A1 8/2016

OTHER PUBLICATIONS

Huawei et al., "On UL Data Transfer for Two-Stage Scheduling," 3GPP TSG-RAN WG2 Meeting #95bis, R2-166443, Kaohsiung, Oct. 10-14, 2016, 3 pgs., XP051150975, 3rd Generation Partnership Project.
(Continued)

*Primary Examiner* — Hanh N Nguyen
(74) *Attorney, Agent, or Firm* — Holland & Hart LLP/QUALCOMM Incorporated

(57) ABSTRACT

Methods, systems, and devices for wireless communication are described. A user equipment (UE) may apply transmission power commands and transmit uplink control information based on a received two-stage grant. For example, a UE may receive a grant including a transmit power command that may be applied to a transmission time interval (TTI) during which the UE transmits. The UE may also apply the transmit power command to a TTI that is a number of TTIs after the grant is received. In some cases, the UE may receive a trigger as part of a two-stage grant, and the application of the transmit power command may be based on the trigger. In another example, the UE may identify uplink control information based on a time delay between a number of TTIs. In some cases, a UE may identify control channel elements based on a DCI type.

12 Claims, 20 Drawing Sheets

(51) Int. Cl.
  *H04W 52/14* (2009.01)
  *H04W 52/22* (2009.01)
  *H04W 72/12* (2009.01)
  *H04W 16/14* (2009.01)
  *H04W 28/02* (2009.01)
  *H04W 52/04* (2009.01)
  *H04W 88/02* (2009.01)
  *H04W 52/38* (2009.01)

(52) U.S. Cl.
  CPC ..... *H04W 72/042* (2013.01); *H04W 72/1289* (2013.01); *H04W 16/14* (2013.01); *H04W 28/0278* (2013.01); *H04W 52/04* (2013.01); *H04W 52/38* (2013.01); *H04W 72/0446* (2013.01); *H04W 88/02* (2013.01)

(58) Field of Classification Search
  CPC ............. H04W 52/146; H04W 52/365; H04W 74/0833; H04L 12/26; H04L 5/0007; H04L 5/0055; H04L 5/0048
  See application file for complete search history.

(56) References Cited

U.S. PATENT DOCUMENTS

| | | | |
|---|---|---|---|
| 9,844,072 B2 * | 12/2017 | Chen | H04L 5/0007 |
| 2016/0128095 A1 | 5/2016 | Damnjanovic et al. | |
| 2017/0118728 A1 | 4/2017 | Harada et al. | |
| 2018/0077658 A1 * | 3/2018 | Nory | H04L 5/0007 |

OTHER PUBLICATIONS

ISA/EP, International Search Report and Written Opinion of the International Searching Authority, Int'l Application No. PCT/US2017/050698, dated Dec. 21, 2017, European Patent Office, Rijswijk, NL, 22 pgs.

ISA/EPO, Partial International Search Report of the International Searching Authority, Int'l. App. No. PCT/US2017/050698, dated Nov. 6, 2017, European Patent Office, Rijswijk, NL, 17 pgs.

Samsung, "Discussion on Two-Step UL Grant Scheduling," 3GPP TSG RAN WG1 Meeting #86, R1-166691, Gothenburg, Sweden, Aug. 22-26, 2016, 3 pgs., XP051125514, 3rd Generation Partnership Project.

* cited by examiner

POWER CONTROL, REPORTING TECHNIQUES, AND CONTROL CHANNEL CONFIGURATION IN UNLICENSED SPECTRUM AND LICENSED ASSISTED ACCESS

CROSS REFERENCES

The present application for patent claims priority to U.S. Provisional Patent Application No. 62/418,112 by Yerramalli, et al., entitled "Power Control, Reporting Techniques, and Control Channel Configuration In Unlicensed Spectrum and Licensed Assisted Access," filed Nov. 4, 2016, assigned to the assignee hereof, and is hereby expressly incorporated by reference herein in its entirety.

BACKGROUND

The following relates generally to wireless communication at a user equipment (UE) and more specifically to power control, reporting techniques, and control channel configuration in unlicensed spectrum and licensed assisted access.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

Some wireless systems may enable communication between a base station and a UE over shared or unlicensed radio frequency spectrum bands, or over different radio frequency spectrum bands (e.g., licensed radio frequency spectrum bands and unlicensed radio frequency spectrum bands). Scheduling of resources in these wireless communications systems may be based on grants provided to a UE from a base station. However, timing constraints associated with the application of commands included in an uplink grant, or to generate reporting for uplink transmissions after receiving the grant, may create complexity at a UE. Improved techniques may thus be used to more efficiently process commands and transmissions associated with uplink grants.

SUMMARY

The described techniques relate to improved methods, systems, devices, or apparatuses that support power control, reporting techniques, and control channel configuration in shared or unlicensed spectrum, and licensed assisted access. Generally, the described techniques provide for the coherent application of transmission power commands and transmission of uplink control information based on a received grant, such as a two-stage grant, in unlicensed spectrum. For example, a user equipment (UE) may receive a grant during a transmission time interval (TTI) (e.g., a subframe). The grant may include a transmit power command, which the UE may apply to a subsequent TTI that includes resources allocated by the grant and used by the UE to transmit to a base station. The UE may also apply the transmit power command to a TTI that is a number of TTIs after the grant is received. In some cases, the UE may receive a trigger as part of a two-stage grant, and the application of the transmit power command and the transmission on the allocated resources may be based on the trigger. In another example, a UE may identify uplink control information based on a time delay between a number of TTIs, where the transmission of the uplink control information may be in response to the trigger. In some cases, the uplink control information may include channel state information, a power headroom report, a buffer status report, or a combination thereof.

A method of wireless communication is described. The method may include receiving, during a first TTI, an uplink grant that includes a first transmit power command, an assignment of resources in a shared radio frequency spectrum band during a second TTI, and timing information for the second TTI, applying the first transmit power control command during the second TTI, and transmitting during the second TTI according to the transmit power control command and the assignment of resources.

An apparatus for wireless communication is described. The apparatus may include means for receiving, during a first TTI, an uplink grant that includes a first transmit power command, an assignment of resources in a shared radio frequency spectrum band during a second TTI, and timing information for the second TTI, means for applying the first transmit power control command during the second TTI, and means for transmitting during the second TTI according to the transmit power control command and the assignment of resources.

Another apparatus for wireless communication is described. The apparatus may include a processor, memory in electronic communication with the processor, and instructions stored in the memory. The instructions may be operable to cause the processor to receive, during a first TTI, an uplink grant that includes a first transmit power command, an assignment of resources in a shared radio frequency spectrum band during a second TTI, and timing information for the second TTI, apply the first transmit power control command during the second TTI, and transmit during the second TTI according to the transmit power control command and the assignment of resources.

A non-transitory computer readable medium for wireless communication is described. The non-transitory computer-readable medium may include instructions operable to cause a processor to receive, during a first TTI, an uplink grant that includes a first transmit power command, an assignment of resources in a shared radio frequency spectrum band during a second TTI, and timing information for the second TTI, apply the first transmit power control command during the second TTI, and transmit during the second TTI according to the transmit power control command and the assignment of resources.

Some examples of the method, apparatus, and non-transitory computer-readable medium described above may further include processes, features, means, or instructions for receiving, during a third TTI, a trigger for a transmission on the assigned resources, wherein the first transmit power command may be applied during the second TTI based at least in part on receiving the trigger, and wherein the transmitting may be in response to the trigger.

Some examples of the method, apparatus, and non-transitory computer-readable medium described above may further include processes, features, means, or instructions for receiving, during the first TTI, downlink control information (DCI) that includes a second transmit power control command. Some examples of the method, apparatus, and non-transitory computer-readable medium described above may further include processes, features, means, or instructions for dropping the second transmit power control command from the DCI based at least in part on receiving the uplink grant and the DCI during the first TTI.

Some examples of the method, apparatus, and non-transitory computer-readable medium described above may further include processes, features, means, or instructions for receiving, during a third TTI that precedes the second TTI by a threshold number of TTIs, DCI that includes a second transmit power control command. Some examples of the method, apparatus, and non-transitory computer-readable medium described above may further include processes, features, means, or instructions for dropping the second transmit power control command from the DCI based at least in part applying the first transmit power control command during the second TTI.

Some examples of the method, apparatus, and non-transitory computer-readable medium described above may further include processes, features, means, or instructions for receiving, during a fourth TTI, a trigger for a transmission on the assigned resources, wherein the transmitting may be in response to the trigger. In some examples of the method, apparatus, and non-transitory computer-readable medium described above, the fourth TTI precedes the second TTI. In some examples of the method, apparatus, and non-transitory computer-readable medium described above, the second TTI precedes the fourth TTI.

Some examples of the method, apparatus, and non-transitory computer-readable medium described above may further include processes, features, means, or instructions for receiving, during the first TTI, DCI that includes a second transmit power control command. Some examples of the method, apparatus, and non-transitory computer-readable medium described above may further include processes, features, means, or instructions for dropping the second transmit power control command from the DCI based at least in part on receiving the uplink grant and the DCI during the first TTI.

Some examples of the method, apparatus, and non-transitory computer-readable medium described above may further include processes, features, means, or instructions for receiving, during a fifth TTI that precedes the second TTI by a threshold number of TTIs, DCI that includes a second transmit power control command. Some examples of the method, apparatus, and non-transitory computer-readable medium described above may further include processes, features, means, or instructions for dropping the second transmit power control command from the DCI based at least in part applying the first transmit power control command during the second TTI. In some examples of the method, apparatus, and non-transitory computer-readable medium described above, the second TTI may be at least four TTIs after the first TTI.

A method of wireless communication is described. The method may include receiving, during a first TTI, an uplink grant that includes an assignment of resources of a shared radio frequency spectrum band, receiving, during a second TTI, a trigger for a transmission on the assigned resources, identifying uplink control information based at least in part on a time difference between at least one of: the first TTI and the second TTI, the first TTI and a third TTI that precedes the first TTI, or the second TTI and a fourth TTI that is subsequent the second TTI, and transmitting the uplink control information during the fourth TTI in response to the trigger.

An apparatus for wireless communication is described. The apparatus may include means for receiving, during a first TTI, an uplink grant that includes an assignment of resources of a shared radio frequency spectrum band, means for receiving, during a second TTI, a trigger for a transmission on the assigned resources, means for identifying uplink control information based at least in part on a time difference between at least one of: the first TTI and the second TTI, the first TTI and a third TTI that precedes the first TTI, or the second TTI and a fourth TTI that is subsequent the second TTI, and means for transmitting the uplink control information during the fourth TTI in response to the trigger.

Another apparatus for wireless communication is described. The apparatus may include a processor, memory in electronic communication with the processor, and instructions stored in the memory. The instructions may be operable to cause the processor to receive, during a first TTI, an uplink grant that includes an assignment of resources of a shared radio frequency spectrum band, receive, during a second TTI, a trigger for a transmission on the assigned resources, identify uplink control information based at least in part on a time difference between at least one of: the first TTI and the second TTI, the first TTI and a third TTI that precedes the first TTI, or the second TTI and a fourth TTI that is subsequent the second TTI, and transmit the uplink control information during the fourth TTI in response to the trigger.

A non-transitory computer readable medium for wireless communication is described. The non-transitory computer-readable medium may include instructions operable to cause a processor to receive, during a first TTI, an uplink grant that includes an assignment of resources of a shared radio frequency spectrum band, receive, during a second TTI, a trigger for a transmission on the assigned resources, identify uplink control information based at least in part on a time difference between at least one of: the first TTI and the second TTI, the first TTI and a third TTI that precedes the first TTI, or the second TTI and a fourth TTI that is subsequent the second TTI, and transmit the uplink control information during the fourth TTI in response to the trigger.

In some examples of the method, apparatus, and non-transitory computer-readable medium described above, the uplink control information comprises channel state information (CSI). Some examples of the method, apparatus, and non-transitory computer-readable medium described above may further include processes, features, means, or instructions for identifying the third TTI as a reference for the CSI based at least in part on the time difference between the first TTI and the third TTI.

Some examples of the method, apparatus, and non-transitory computer-readable medium described above may further include processes, features, means, or instructions for determining whether the time difference between the first TTI and the second TTI exceeds a threshold. Some examples of the method, apparatus, and non-transitory computer-readable medium described above may further include processes, features, means, or instructions for identifying a fifth TTI as a reference for the CSI when the time difference between the first TTI and the second TTI exceeds the threshold, wherein the fifth TTI precedes the second TTI. Some examples of the method, apparatus, and non-transitory computer-readable medium described above may further include processes, features, means, or instructions for identifying the third TTI as the reference for the CSI when the time difference between the first TTI and the second TTI may be less than or equal to the threshold.

In some examples of the method, apparatus, and non-transitory computer-readable medium described above, the uplink control information comprises a power headroom report that may be based at least in part on a signal within the fourth TTI. In some examples of the method, apparatus, and non-transitory computer-readable medium described above, the uplink control information comprises a power headroom report that may be based at least in part on a signal within a fifth TTI, wherein the fifth TTI may be identified based at least in part on the time difference between the second TTI and the fourth TTI.

In some examples of the method, apparatus, and non-transitory computer-readable medium described above, the uplink control information comprises a buffer status report. In some examples of the method, apparatus, and non-transitory computer-readable medium described above, the buffer status report may be multiplexed with uplink data.

DETAILED DESCRIPTION

Figure 1:
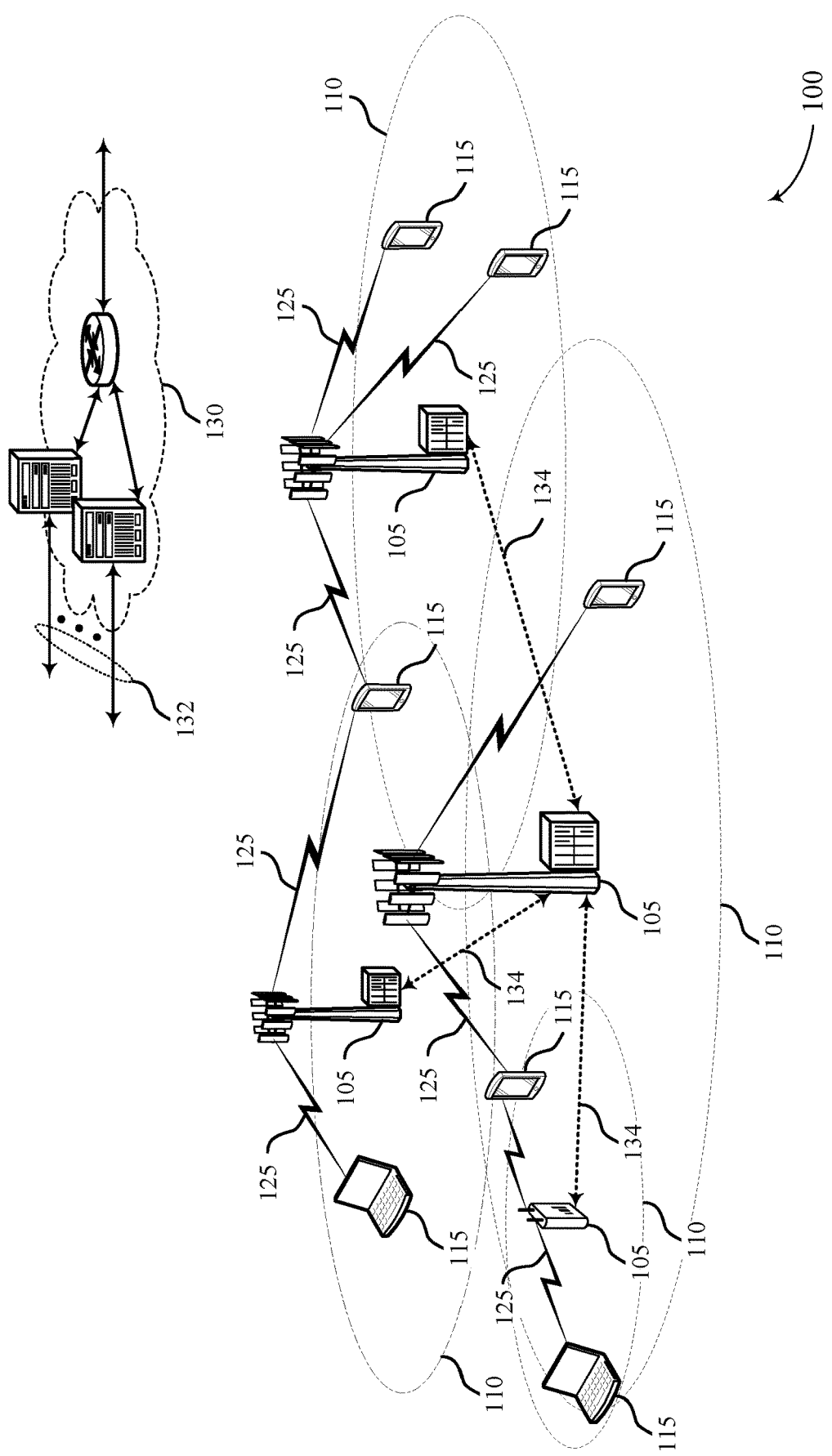
FIG. 1 illustrates an example of a system for wireless communication at a user equipment (UE) that supports power control, reporting techniques, and control channel configuration in unlicensed spectrum and licensed assisted access in accordance with aspects of the present disclosure.

A user equipment (UE) may use information received in an uplink grant, or the timing of the uplink grant, to determine when to apply a transmit power control (TPC) command received from a base station. The UE may receive a TPC command in an uplink grant, and may apply the TPC command in the same transmission time interval (TTI) in which the grant was received or in a subsequent TTI. For example, the UE may apply a TPC command to a TTI (e.g., a subframe) that includes resources allocated by the grant for an uplink transmission. Additionally or alternatively, the UE may apply the TPC command to a subsequent subframe. In some cases, the UE may apply the TPC in a subsequent subframe even if an uplink transmission corresponding to the grant occurs later than the subsequent subframe.

The UE may apply the TPC command differently depending on whether two-stage grants or fixed-delay grants are employed. A two-stage grant may refer to a combination of control information that includes a resource assignment and a subsequent trigger to transmit using the assigned resources. In other words, with a two-stage grant, the UE may learn which resources to use from an uplink grant through a first stage of the two-stage grant, and the UE may delay transmission on those resources until it receives a subsequent control message or trigger to transmit on the resources, through a second stage of the two-stage grant. The application of the TPC command may be based on a trigger received at the UE, where the TPC may or may not be applied if the trigger is not received.

A fixed-delay grant, by contrast, may include an assignment of resources that the UE may use to transmit after a fixed or set delay. In other words, with a fixed-delay grant, the UE may transmit on the assigned resources after waiting for the fixed delay to expire and without receiving a subsequent control message or trigger. In some cases, some of the techniques described with reference to two-stage grants may also apply to fixed-delay grants. For instance, the UE may apply a TPC received in an uplink grant after the fixed delay period.

In some examples, a collision involving two conflicting TPC commands for a single subframe may occur. These collisions may occur, for example, because the UE received multiple conflicting TPC commands in the same subframe, or because multiple conflicting TPC commands are scheduled to be applied in the same subframe, and the UE may use different techniques to resolve these conflicting TPC commands, as described herein. A UE may further use different techniques for uplink control information reporting associated with two-stage grants. That is, a UE may transmit channel state information (CSI) in uplink subframes granted by the two-stage grants based on a time delay between various subframes. A UE may also transmit reporting to a base station, such as a power headroom report (PHR) or a buffer status report (BSR) using uplink subframes corresponding to two-stage grants.

The techniques described herein may apply in shared or unlicensed radio frequency spectrum bands, which may be used for communications according to the Long Term Evolution (LTE) or LTE-Advanced (LTE-A) standards or other wireless communication schemes. Shared or unlicensed radio frequency spectrum may be used in combination with, or independent from, a dedicated or licensed radio frequency spectrum band. The dedicated radio frequency spectrum band may include a radio frequency spectrum band licensed to particular users for particular uses. The shared radio frequency spectrum band may include a radio frequency spectrum band available for Wi-Fi use, a radio frequency spectrum band available for use by different radio access technologies, or a radio frequency spectrum band available for use by multiple mobile network operators (MNOs) in an equally shared or prioritized manner.

Aspects of the disclosure introduced above are described below in the context of a wireless communications system. Further examples are then provided of transmit power application and reporting schemes and control channel monitoring. Aspects of the disclosure are further illustrated by and described with reference to apparatus diagrams, system diagrams, and flowcharts that relate to power control, reporting techniques, and control channel configuration in unlicensed spectrum and licensed assisted access.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a LTE (or LTE-Advanced) network, or a New Radio (NR) network. In some cases, wireless communications system 100 may support enhanced broadband communications, ultra-reliable (i.e., mission critical) communications, low latency communications, and communications with low-cost and low-complexity devices. Wireless communications system 100 may support the application of transmit power control commands and the reporting of uplink channel information in unlicensed spectrum.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a TTI of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

A base station 105 may be connected by an S1 interface to the core network 130. The core network may be an evolved packet core (EPC), which may include at least one mobility management entity (MME), at least one serving gateway (S-GW), and at least one packet data network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service (PSS).

In some cases, wireless communications system 100 may utilize both licensed and unlicensed radio frequency spectrum bands. For example, wireless communications system 100 may employ LTE License Assisted Access (LTE-LAA) or LTE Unlicensed (LTE-U) radio access technology or NR technology in an unlicensed band such as the 5 GHz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a carrier aggregation (CA) configuration in conjunction with component carriers (CCs) operating in a licensed band. Operations in unlicensed spectrum may include downlink transmissions, uplink transmissions, or both. Duplexing in unlicensed spectrum may be based on frequency division duplexing (FDD), time division duplexing (TDD) or a combination of both.

Time intervals may be expressed in multiples of a basic time unit (e.g., the sampling period, $T_s=1/30,720,000$ seconds). Time resources may be organized according to radio frames of length of 10 ms ($T_f=307200 \cdot T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI may be shorter than a subframe or may be dynamically selected (e.g., in short TTI bursts or in selected component carriers using short TTIs).

A carrier may also be referred to as a CC, a layer, a channel, etc. The term "component carrier" may refer to each of the multiple carriers utilized by a UE 115 in CA operation, and may be distinct from other portions of system bandwidth. For instance, a component carrier may be a relatively narrow-bandwidth carrier susceptible of being utilized independently or in combination with other component carriers. Each component carrier may provide the same capabilities as an isolated carrier based on release 8 or release 9 of the LTE standard. Multiple component carriers may be aggregated or utilized concurrently to provide some UEs 115 with greater bandwidth and, e.g., higher data rates. Thus, individual component carriers may be backwards compatible with legacy UEs 115 (e.g., UEs 115 implementing LTE release 8 or release 9); while other UEs 115 (e.g., UEs 115 implementing post-release 8/9 LTE versions), may be configured with multiple component carriers in a multi-carrier mode.

A carrier used for downlink may be referred to as a downlink CC, and a carrier used for uplink may be referred to as an uplink CC. A UE 115 may be configured with multiple downlink CCs and one or more uplink CCs for carrier aggregation. Each carrier may be used to transmit control information (e.g., reference signals, control channels, etc.), overhead information, data, etc. A UE 115 may communicate with a single base station 105 utilizing multiple carriers, and may also communicate with multiple base stations simultaneously on different carriers. Each cell of a base station 105 may include an uplink CC and a downlink CC.

The coverage area 110 of each serving cell for a base station 105 may be different (e.g., CCs on different frequency bands may experience different path loss). In some examples, one carrier is designated as the primary carrier, or primary component carrier (PCC), for a UE 115, which may be served by a primary cell (PCell). Primary cells may be semi-statically configured by higher layers (e.g., radio resource control (RRC), etc.) on a per-UE basis. Certain uplink control information, e.g., acknowledgment/negative acknowledgment (ACK/NACK), channel quality indicator (CQI), and scheduling information transmitted on physical uplink control channel (PUCCH), are carried by the primary cell. Additional carriers may be designated as secondary carriers, or secondary component carriers (SCC), which may be served by secondary cells (SCells). Secondary cells may likewise be semi-statically configured on a per-UE basis. In some cases, secondary cells may not include or be configured to transmit the same control information as the primary cell.

In some cases, wireless communications system 100 may utilize enhanced component carriers (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration may be associated with increased subcarrier spacing. A TTI in an eCC may consist of one or multiple symbols. In some cases, the TTI duration (that is, the number of symbols in a TTI) may be variable. In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable.

A physical downlink control channel (PDCCH) may carry downlink control information (DCI) in control channel elements (CCEs), which may consist of nine logically contiguous resource element groups (REGs), where each REG contains 4 resource elements (REs). DCI includes information regarding downlink scheduling assignments, uplink resource grants, transmission scheme, uplink power control, hybrid automatic repeat request (HARD) information, modulation and coding scheme (MCS) and other information. The size and format of the DCI messages can differ depending on the type and amount of information that is carried by the DCI. For example, if spatial multiplexing is supported, the size of the DCI message is large compared to contiguous frequency allocations. DCI size and format may depend on the amount of information as well as factors such as bandwidth, the number of antenna ports, and duplexing mode.

In some examples, an enhanced PDCCH (EPDCCH) may be employed. For example, a control channel may be frequency division multiplexed within a carrier bandwidth and may span the duration of several TTIs. EPDCCH may be characterized by enhanced control channel elements (ECCEs). An ECCE may have a different number of REGs than a control channel element (CCE), and the REGs may or may not be contiguous.

A UE 115 may coordinate transmit power with a serving base station 105 to mitigate interference, improve the uplink data rate, and prolong battery life. Uplink power control may include a combination of open-loop and closed-loop mechanisms. In open-loop power control the UE 115 transmit power may depend on estimates of the downlink path-loss and channel configuration. In closed-loop power control that the network can directly control the UE transmit power using explicit power-control commands. Open-loop power control may be used for initial access, whereas both open and closed loop control may be used for uplink control and data transmission. A UE 115 may determine power using an algorithm that takes into account a maximum transmission power limit, a target base station receive power, path loss, MCS, the number of resources used for transmission, and the format of the transmitted data (e.g., PUCCH format). Power adjustments may be made by a base station 105 using a TPC message, which may incrementally adjust the transmit power of a UE 115 as appropriate.

The PUCCH may be mapped to a control channel defined by a code and two consecutive resource blocks. Uplink control signaling may depend on the presence of timing synchronization for a cell. PUCCH resources for scheduling request (SR) and channel quality indicator (CQI) reporting may be assigned (and revoked) through radio resource control (RRC) signaling. In some cases, resources for SR may be assigned after acquiring synchronization through a RACH procedure. In other cases, an SR may not be assigned to a UE 115 through a random access channel (RACH) (i.e., synchronized UEs may or may not have a dedicated SR channel). PUCCH resources for SR and CQI may be lost when the UE is no longer synchronized.

A base station 105 may gather channel condition information from a UE 115 in order to efficiently schedule the channel. This information may be sent from the UE 115 in the form of a channel state report. A channel state report may contain an rank indicator (RI) requesting a number of layers to be used for downlink transmissions (e.g., based on the antenna ports of the UE 115), a precoding matrix indicator (PMI) indicating a preference for which precoder matrix should be used (based on the number of layers), and a CQI representing the highest MCS that may be used. CQI may be calculated by a UE 115 after receiving predetermined pilot symbols such as a cell-specific reference signal (CRS) or channel state information reference signal (CSI-RS). RI and PMI may be excluded if the UE 115 does not support spatial multiplexing (or is not in support spatial mode). The types of information included in the report determines a reporting type. Channel state reports may be periodic or aperiodic. That is, a base station 105 may configure a UE 115 to send periodic reports at regular intervals, and may also request additional aperiodic reports as needed. Aperiodic reports may include wideband reports indicating the channel quality across an entire cell bandwidth, UE selected reports indicating channel quality of a subset of the cell bandwidth, or of particular sub-bands, or configured reports in which the sub-bands reported are selected by the base station 105.

A UE 115 may also provide reports to the base station regarding transmission power or data that the UE 115 intends to transmit. For example, the UE 115 may transmit an indication to the base station 105 regarding an amount of transmission power left for the UE 115 to use in addition to power being used for a current transmission (e.g., a power headroom report (PHR)). Additionally, the UE 115 may send a buffer status report (BSR) to the base station 105 indicating an amount of buffered data at the UE 115 that is pending transmission.

Wireless communications system 100 may enable the coherent application of transmission power commands and transmission of uplink control information based on a received grant. For example, a UE 115 may receive a grant from a base station 105 during a TTI (e.g., a subframe). The grant may include a TPC command, which the UE 115 may apply to a subsequent TTI that includes resources allocated by the grant and used by the UE 115 to transmit to a base station 105. The UE 115 may also apply the TPC to a TTI that is a number of TTIs after the grant is received. In some cases, the UE 115 may receive a trigger as part of a two-stage grant, and the application of the TPC and the transmission on the allocated resources may be based on the trigger. In another example, a UE 115 may identify uplink control information based on a time delay between a number of TTIs, where the transmission of the uplink control information may be in response to the trigger. In some cases, the uplink control information may include CSI, a PHR, a BSR, or a combination thereof.

Figure 2:
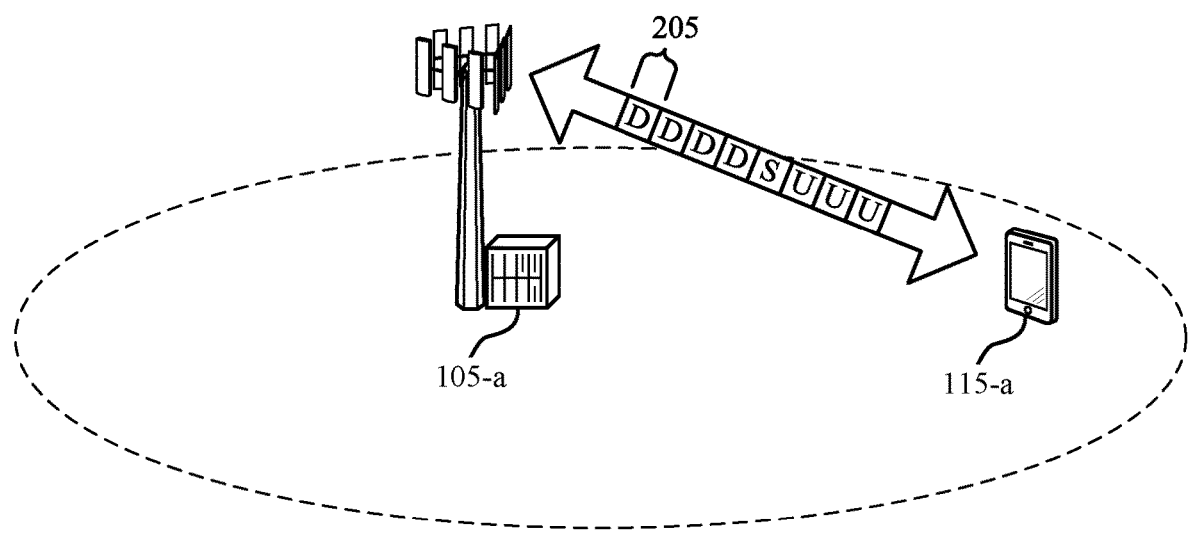
FIG. 2 illustrates an example of a wireless communications system that supports power control, reporting techniques, and control channel configuration in unlicensed spectrum and licensed assisted access in accordance with aspects of the present disclosure.

FIG. 2 illustrates an example of a wireless communications system 200 that supports two-stage uplink grants for communications utilizing unlicensed spectrum. The wireless communications system 200 may include a base station 105-*a* and UE 115-*a*, which may be examples of the corresponding devices as described with reference to FIG. 1. CA techniques may be used by UE 115-*a* and base station 105-*a* to communicate with each other, and these communications may utilize shared or unlicensed spectrum. Operations in unlicensed spectrum may be based on a CA configuration in conjunction with component carriers operating in licensed spectrum.

In some instances, a shared spectrum band may refer to spectrum that is lightly licensed and/or in which there may be some level of coordination among communications of different radio access technologies (RATs), or some level of preference given to communications of a particular RAT, such as an incumbent RAT, for example. In other instances, a shared spectrum band may generally refer to spectrum in which different RATs coexist or operate within the same radio frequency spectrum band, which may include lightly licensed/coordinated spectrum or, alternatively, purely unlicensed spectrum in which different RATs may freely contend for access to the channel medium using various channel contention techniques. The aspects described in the present disclosure may be applicable to various shared or unlicensed spectrum regimes. Accordingly, the terms shared spectrum and unlicensed spectrum are used interchangeably herein unless otherwise noted.

Operations in shared or unlicensed spectrum may include downlink transmissions, uplink transmissions, or both. Subframes 205 of a transmission may accordingly be configured for downlink communications from base station 105-*a* to UE 115-*a*, or configured for uplink communications from UE 115-*a* to base station 105-*a*, or both. A downlink transmission may include downlink control information (DCI). DCI may include information regarding uplink grants, uplink power control, scheduling assignments, and transmission schemes.

An uplink grant within wireless communications system 200 may be a fixed-delay grant or a two-stage grant, and transmission power control applied at UE 115-*a* or reporting sent to base station 105-*a* may be based on the uplink grant. A fixed-delay grant may set a fixed delay between the grant and a transmission. Alternatively, a two-stage grant may include a first stage of the grant having a certain first control information that may indicate to UE 115-*a*, for example, resources to use for a transmission packet (e.g., time-frequency resources, a resource block (RB) allocation, and the like, where the control information may further include an indication of a modulation scheme, a transport block size, etc.). Then, a second stage of the two-stage grant (i.e., a trigger) having different control information may, for example, indicate to UE 115-*a* a timing to transmit the packet. Two-stage grants may be used in operations in unlicensed spectrum, which may include the use of an anchor carrier. In some cases, a two-stage grant may be utilized for applications including, for example, TPC, CSI reporting, PHR, and BSR reporting.

The use of two-stage grants in unlicensed spectrum may enable coherent scheduling of wireless communications, as the medium may not always be available for UE 115-*a* to transmit a packet (e.g., due transmissions by other wireless devices on the medium). For instance, a resource grant may be provided to UE 115-*a* as a two-stage grant that spans multiple transmission opportunities (TxOPs), where the first stage may indicate resources for an uplink transmission that may occur during a subsequent TxOP. The uplink transmission by UE 115-*a* may then be initiated by the trigger, with the trigger being provided in cases where channel access has been obtained, for example, through a LBT procedure. Thus, the two-stage grant may allow the network to separately signal or provide an indication to UE 115-a when the medium is available for transmission through the use of the subsequent trigger. In some examples, the different stages of the two-stage grant may be monitored by UE 115-a based on configured monitoring periods or windows for receiving portions of the two-stage grant.

UE 115-a may use uplink grants to determine when to apply a transmission power control received from base station 105-a. In some cases, when receiving a two-stage grant, UE 115-a may not know whether to apply a TPC command until both stages of the two-stage grant have been received. For example, the TPC command could be applied after a first grant is received (e.g., a first trigger), or after a second grant is received (e.g. a second trigger). UE 115-a may have further received previous uplink grants that may be applied; for example, UE 115-a may have received an uplink grant in a transmission in an earlier subframe 205.

Further, if TPC is configured in accordance with an accumulation mode, UE 115-a may perform a step-by-step power adjustment based on a power of previous transmission. For instance, each TPC may signal a power step relative to the previous TPC, which may allow for finer tuning of transmit power. In the accumulation mode for TPC, if UE 115-a receives a first TPC command signaling a power offset of 1 dB and, in a subsequent TTI (e.g., subframe 205), receives a second TPC command signaling a power offset of 3 dB, UE 115-a may apply a power offset corresponding to the sum of the two power offsets (i.e., 4 dB). In the accumulation mode, if UE 115-a has outstanding fixed-delay grants and two-stage grants (e.g., TPC commands received with prior grants that have not been applied to an uplink transmission yet), UE 115-a may not know whether to apply the TPC commands of outstanding fixed-delay grants or the two-stage grants. Similarly, if a TPC command is received in a two-stage grant, and a TPC command is received in a DCI format (e.g., DCI format 3/3A) on the PCell when the two-stage grant is outstanding, UE 115-a may again not know which TPC commands to apply. Thus, a method may be defined that UE 115-a may follow such that the TPC operates predictably for both two-stage grants and fixed-delay grants.

UE 115-a may use different techniques to apply TPC commands for subframes 205 used for uplink transmissions and associated with two-stage grants (e.g., scheduled according to a received grant in subframe n). For example, UE 115-a may apply a received TPC command to a next subframe 205 used for uplink transmission after receiving a trigger. However, if the trigger (e.g., the second stage of the two-stage grant) is not received, then UE 115-a may determine not to apply the TPC command. However, the determination of when to apply TPC may be made quickly, because the time between the trigger and the transmission may be short. To alleviate this quick determination, a TPC command may be applied in a later subframe 205 (e.g., subframe n+4) irrespective of whether the trigger is received or not. The described techniques may reduce complexity of handling two-stage grants at UE 115-a when applying TPC commands received from base station 105-a.

In some examples, the techniques described with reference to two-stage grants may also be applied to fixed-delay grants. That is, to achieve a lesser degree of complexity for different grants provided to UE 115-a, techniques described above for two-stage grants may be similarly applied to fixed-delay grants. For example, UE 115-a may apply a TPC command in a subframe 205 used for an uplink transmission that includes resources allocated by the received grant, where the grant may provide a transmission timeline for a the subframe 205. That is, an assignment of resources to UE 115-a may specify a timeline for TPC. In such cases, the timeline between when a grant is received and when UE 115-a applies the TPC for uplink transmissions in a subframe 205 may be variable for different resource assignments (e.g., not fixed). UE 115-a may alternatively apply the TPC command in a subsequent subframe 205 (e.g., subframe n+4 if the grant is received in subframe n), where the TPC may be applied in that subframe 205 (e.g., subframe n+4) and all subsequent transmissions, even if the uplink transmission corresponding to that grant does not occur until a later time (e.g., after subframe n+4).

In some cases, there may be a collision involving two conflicting TPC commands for a single subframe 205. This may occur when, for example, UE 115-a receives a TPC command from both an anchor carrier provided by a PCell operating in a licensed spectrum and a second component carrier provided by a SCell operating in an unlicensed or shared spectrum. In a first case where UE 115-a receives two TPC commands in the same subframe 205, UE 115-a may resolve this conflict by dropping one of the TPC commands. In a second case where two TPC commands are scheduled to be applied in the same subframe 205, UE 115-a may look back to determine whether there is a TPC command in previous subframe 205 (e.g., subframe n−4; or, subframe n−k for time division duplex (TDD)), then UE 115-a may apply this TPC to the present subframe 205 (e.g., subframe n), and drop conflicting TPC commands. In some cases, the TPC command that is dropped may correspond to a TPC indicated by a DCI format.

UE 115-a may use different techniques for CSI reporting (such as aperiodic CSI (A-CSI)) associated with two-stage grants. The number of subframes 205 between a trigger (e.g., a second grant in a physical uplink shared channel (PUSCH)) and an A-CSI transmission may be short, one or two or more subframes 205, for example. Accordingly, UE 115-a may not have enough time to compute CSI after receiving the uplink grant, and so may not be able to efficiently multiplex a latest A-CSI for two-stage grants due to this reduced timeline.

However, various methods may allow UE 115-a to transmit A-CSI in uplink subframes 205 granted by two-stage grants. A reference subframe 205 for A-CSI may be determined to be the latest valid subframe 205 a certain time duration before a first grant, for example, 4 ms before the uplink grant. In an example, if UE 115-a receives a grant in a current subframe 205 (e.g., subframe n), the reference subframe 205 may be a previous subframe 205 (e.g., subframe n−4). In this case, it may not matter when the trigger is received. Additionally or alternatively, UE 115-a may compare the duration of the delay between the trigger (i.e., second grant) to a set time duration, for example, 4 ms. If the delay between the trigger and a subframe 205 used for CSI reporting is greater than the set time duration, UE 115-a may use the most recent valid reference subframe 205. If the delay is less than the set duration, UE 115-a may revert to determining the reference subframe 205 to be the latest valid subframe 205 before the set duration before the trigger, for example, the latest valid subframe 205 4 ms before the trigger.

UE 115-a may further transmit reporting to base station 105-a, such as a PHR or BSR using subframes 205 granted by two-stage grants. For PHR or BSR reporting in two-stage grants, there may be a limited time after the trigger (i.e., a second portion of a two-stage grant) to compute the PHR and BSR. However, PHR and BSR may be computed more quickly, as it may not be a complex report that UE 115-a generates. For BSR multiplexing in two-stage grants, UE 115-a may transmit the latest BSR after receiving the trigger. Because the BSR may be computed more quickly, once UE 115-a receives the two-stage grant, UE 115-a may have already been able to check the buffer state and include the calculated BSR in a transmitted packet. For PHR multiplexing, the reference subframe 205 may be assumed to be the subframe 205 in which the PHR was transmitted. Additionally or alternatively, as with A-CSI, the reference subframe 205 for PHR and BSR may be a function of the delay between the trigger and the transmission. The delay between the trigger and the transmission may be compared to a set time duration. If the delay is greater than the set time duration, a certain subframe 205 may be used as the reference subframe 205, and if the delay is less than the set time duration, a different subframe 205 may be used as the reference subframe 205.

In some cases, a group of EPDCCH candidates, each EPDCCH candidate corresponding to a number of ECCEs according to an aggregation level, may define a search space, where one of the EPDCCH candidates within the search space may be a UE-dedicated EPDCCH. UE 115-a may receive one or more EPDCCHs candidates at an aggregation level chosen from a set of defined aggregation levels that are supported for the particular downlink. The chosen aggregation level may correspond to a number of ECCEs. The ECCEs may, for example, be mapped to the DCI. For example, the aggregation level L may be an element from a set of aggregation levels {1, 2, 4, 8, 16, 32}. The EPDCCH candidates may define a search space which UE 115-a may monitor. One of the EPDCCH candidates may be a UE-dedicated EPDCCH containing information dedicated to that specific UE 115 (e.g., UE 115-a). However, UE 115-a may not know which EPDCCH is its UE-dedicated. Through blind decoding, UE 115-a may decode each EPDCCH within the search space to determine that one of the EPDCCH candidates may be a UE-dedicated EPDCCH.

When there is an increased number of EPDCCH candidates at an aggregation level in a search space, the EPDCCH candidates may overlap in spectrum and may thus complicate the blind decoding process. This may be because a parameter (e.g., a pdcch-candidateReductions parameter) is configured to allow either an increased number of EPDCCH candidates, or a different number of EPDCCH candidates in different scheduled cells in the case of cross-carrier scheduling. In a method for transmitting over shared or unlicensed spectrum, blind decoding adjustments may, for example, be applied to account for a specific serving cell or an aggregation level. Blind decoding adjustments may further be applied to account for a particular DCI format (e.g., DCI format 0A/0B/4A/4B). This may allow the number of EPDCCH candidates in a search space to be increased at a higher aggregation level while minimizing or optimizing an amount of overlap of EPDCCH candidates. Therefore, it may be beneficial to define sets of EPDCCH candidates in a particular search space such that the overlap of EPDCCH candidates may be reduced or optimized.

UE 115-a may monitor a search space including a set of EPDCCH candidates on one or more activated serving cells as configured by higher layer signaling. For EPDCCH monitoring, higher layer signaling may indicate physical resource block (PRB) pairs corresponding to an EPDCCH-PRB-set. UE 115-a may then be configured with one or more EPDCCH-PRB-sets for EPDCCH monitoring of a designated search space. The monitoring of the set of EPDCCH candidates may include attempting to decode one or more of the EPDCCHs in the set of EPDCCH candidates according to monitored parameters including an EPDCCH-PRB set p, a serving cell index c, and/or DCI formats d. The set of EPDCCH candidates that UE 115-a may monitor may define an EPDCCH UE-specific search space $ES_k^{(L)}$ in a subframe k, where L is an element of a set of aggregation levels as defined above.

For an EPDCCH-PRB-set p, the ECCEs corresponding to an EPDCCH candidate m of the search space space $ES_k^{(L)}$ given for a DCI format may be given by:

$$L\left\{\left(Y_{p,k} + \left\lfloor \frac{m \cdot N_{ECCE,p,k}}{L \cdot M_{p,c,d}^{(L)}} \right\rfloor + b\right) \bmod \left\lfloor \frac{N_{ECCE,p,k}}{L} \right\rfloor \right\} + i, \quad (1)$$

where $Y_{p,k}$ is defined according to below; m=0, 1, . . . $M_{p,c,d}^{(L)}$, where $M_{p,c,d}^{(L)}$ is defined according to below; $N_{ECCE,p,k}$ is the number of ECCEs in EPDCCH-PRB-set p of subframe k; DCI type d may be either 0 or 1; $b=n_{CI}$ if UE 115-a is configured with a carrier indicator field for the serving cell on which EPDCCH is monitored where $n_{CI}$ is the carrier indicator field value, otherwise b=0; and i=0, . . . , L−1.

The variable $Y_{p,k}$ is defined:

$$Y_{p,k}=(A_p \cdot Y_{p,k-1}) \bmod D, \quad (2)$$

where $A_p$ may be given by either $A_0$=39827 or $A_1$=39829; $Y_{p,k-1}=n_{RNTI}\neq 0$, where $n_{RNTI}$ is a radio network temporary identifier (RNTI) value, and here k=$\lfloor n_s/2 \rfloor$ where $n_s$ is a slot number within a radio frame; and D=65537.

The maximum number of EPDCCH candidates to be monitored may account for factors such as an EPDCCH-PRB-set, a serving cell index, and/or a DCI type based on how many transport blocks the DCI may schedule. For SCells used in a method for transmitting over an unlicensed spectrum, $M_{p,c,d}^{(L)}$ may be the maximum number of EPDCCH candidates to monitor at an aggregation level L after taking into account various factors. $M_{p,c,d}^{(L)}$ may first adjust for a higher layer parameter (e.g., the parameter pdcch-candidateReductions). $M_{p,c,d}^{(L)}$ may then account for a EPDCCH-PRB-set p. Additionally or alternatively, $M_{p,c,d}^{(L)}$ may account for a serving cell index c that may correspond to a serving cell for which EPDCCH is being monitored. Additionally or alternatively, $M_{p,c,d}^{(L)}$ may further account for a DCI type d, corresponding to how many transport blocks the DCI may schedule. For example, UE 115-a may bifurcate the EPDCCH candidates into two types, being a type 0 for downlink and uplink DCIs that can schedule up to one transport block, and a type 1 for downlink and uplink DCIs that can schedule up to two transport blocks. By bifurcating the EPDCCH candidates into two groups or more groups, UE 115-a may thus reduce or optimize the amount of overlap of EPDCCH candidates. Alternatively, $M_{p,c,d}^{(L)}$ may otherwise equal $M_p^{(L)}$.

Figure 3:
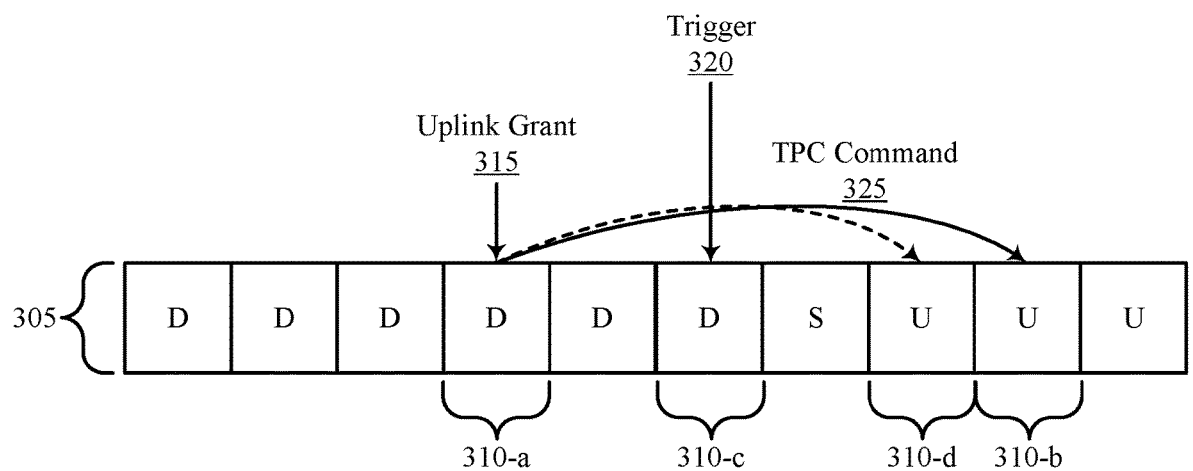
FIG. 3 illustrates an example of a transmission power adjustment scheme that supports power control, reporting techniques, and control channel configuration in unlicensed spectrum and licensed assisted access in accordance with aspects of the present disclosure.

FIG. 3 illustrates an example of a transmission power adjustment scheme 300 for power control, reporting techniques, and control channel configuration in a shared or unlicensed spectrum and licensed assisted access. Transmission power adjustment scheme 300 may be utilized by a UE 115 as described with reference to FIGS. 1 and 2. For example, a UE 115 may adjust a transmission power based on a TPC command included in a received uplink grant according to transmission power adjustment scheme 300. Additionally, transmission power adjustment scheme 300 may be an example of the adjustment of a transmission power for power control commands included in two-stage grants or time-delayed grants.

Transmission power adjustment scheme 300 may include a frame 305 that includes a number of TTIs 310 (e.g., subframes), that are used for communication between a UE 115 and a base station 105. For example, frame 305 may include a number of TTIs 310 (e.g., a first TTI 310-*a*, a second TTI 310-*b*, a third TTI 310-*c*, and so on) that are used for downlink transmissions from the base station 105 and uplink transmissions from the UE 115. Additionally, frame 305 may include a number of different carriers or tones that are used for uplink and downlink communications in a shared or unlicensed spectrum.

A UE 115 may receive an uplink grant 315 during the first TTI 310-*a*, and the uplink grant 315 may include a transmit power command (e.g., a TPC command 325) from a base station 105. The uplink grant 315 may further include an assignment of resources that the UE 115 uses to transmit to the base station 105. The uplink grant 315 may also include timing information or an indication of timing for a subsequent TTI 310. The timing information may indicate to the UE 115 when a subsequent TTI 310 for uplink communications occurs. Based on the received uplink grant and the assignment of resources, the UE 115 may apply the TPC command 325 during the second TTI 310-*b*. That is, the TPC command 325 may be applied in the subframe used for uplink transmissions by the UE 115, where the subframe used for uplink transmissions includes the resources assigned by the received uplink grant (e.g., at time specified by the resource assignment).

In some cases, a trigger 320 may be received during the third TTI 310-*c*, where the trigger 320 is part of a two-stage grant indicating resources the UE 115 may use for uplink transmissions. That is, the uplink grant 315 may include control information indicating a construction or configuration of an uplink packet including, for example, the TPC command 325, and the trigger 320 may indicate to the UE 115 a timing to transmit the packet (e.g., during the second TTI 310-*b*). As previously described, two-stage grants may be utilized for wireless communications in unlicensed spectrum because the medium may not always be available for the UE 115 to transmit the uplink packet. As an example, another wireless device may gain access to the medium prior to reception of the trigger 320. Thus, a two-stage grant may allow the network to separately signal or provide the trigger 320 to the UE 115 when the medium is available. In other words, while two-stage grants may be signaled during one TxOP, the same techniques may also be applied to multiple TxOPs, where the UE 115 or the base station 105 may have discontinuous access to the medium between different TxOPs. Accordingly, the TPC command 325 may be applied when the UE 115 transmits during the second TTI 310-*b* based on the received trigger 320. In some examples, if the trigger 320 is not received, then the UE 115 may refrain from applying the TPC command 325.

The TPC command 325 may also be applied to a TTI 310 that is at least four TTIs 310 after the uplink grant 315 (and the TPC command 325) is received. For instance, the TPC command 325 may be included in the uplink grant 315 received during the first TTI 310-*a*. The TPC command 325 may then be applied to a TTI 310 that is at least four TTIs after the first TTI 310-*a* (e.g., the fourth TTI 310-*d*). Accordingly, the application of the TPC command 325 may apply for all transmissions that are sent after the fourth TTI 310-*d*, even if the resources scheduled by the uplink grant 315 occur at a later time, such as in the second TTI 310-*b*.

Figure 4:
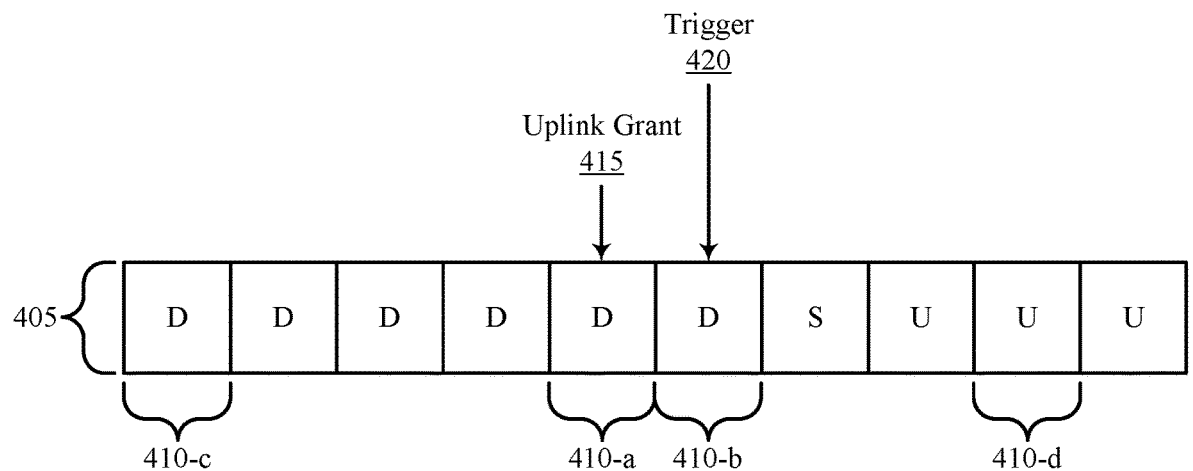
FIG. 4 illustrates an example of a reporting scheme that supports power control, reporting techniques, and control channel configuration in unlicensed spectrum and licensed assisted access in accordance with aspects of the present disclosure.

FIG. 4 illustrates an example of a reporting scheme 400 for power control, reporting techniques, and control channel configuration in shared or unlicensed spectrum and licensed assisted access. Reporting scheme 400 may be utilized by a UE 115 as described with reference to FIGS. 1 and 2. For example, a UE 115 may report CSI, a BSR, or a PHR based on a received uplink grant according to reporting scheme 400. Additionally, reporting scheme 400 may be an example of the transmission of uplink control information based on the receipt of two-stage grants.

Reporting scheme 400 may include a frame 405 that includes a number of TTIs 410 (e.g., subframes), that are used for communication between a UE 115 and a base station 105. For example, frame 405 may include a number of TTIs 410 (e.g., a first TTI 410-*a*, a second TTI 410-*b*, a third TTI 410-*c*, and so on) that are used for downlink transmissions from the base station 105 and uplink transmissions from the UE 115. Additionally, frame 405 may include a number of different carriers or tones that are used for uplink and downlink communications in shared or unlicensed spectrum.

The UE 115 may receive an uplink grant 415 (e.g., a two-stage grant) during the first TTI 410-*a* of the frame 405, followed by a trigger 420 received during the second TTI 410-*b*. The UE 115 may then use a resource allocation indicated by the uplink grant 415 to provide uplink control information to a base station 105. As an example, the UE 115 may provide CSI to the base station 105, where a TTI 410 used as a reference for the CSI may include the third TTI 410-*c*. That is, the third TTI 410-*c* may be used as a latest reference subframe for the CSI, where the third TTI 410-*c* may precede the first TTI 410-*a*. In some cases, there may be a certain time delay between the third TTI 410-*c* and the first TTI 410-*a* (e.g., 4 ms).

In some cases, the CSI may be based on a time delay between the TTI 410 during which the trigger 420 was received and the TTI 410 that CSI is transmitted in (e.g., a time delay between the second TTI 410-*b* and a fourth TTI 410-*d*). For instance, the UE 115 may determine whether the time delay between the second TTI 410-*b* and the fourth TTI 410-*d* is greater than a predetermined duration (e.g., 4 ms). If the time delay is greater than the predetermined duration, the UE 115 may use a latest TTI 410 as a reference for the CSI transmitted to the base station 105. For example, although not shown in the figure, if there are more than four TTI 410 between the trigger received at TTI 410-*b* and the scheduled CSI transmission at 410-*d*, the UE 115 may use a TTI that occurs between TTI 410-*b* and TTI 410-*d* as the reference subframe for determining CSI, rather than TTI 410-*c*. Otherwise, the UE 115 may use the TTI 410 that precedes, by a certain duration, the TTI 410 during which the uplink grant 415 was received (e.g., the UE 115 may use the TTI 410-*c* as it may precede the first TTI 410-*a* by a certain amount of time).

A UE 115 may also transmit a PHR or a BSR to a base station 105 based on the receipt of the uplink grant 415 and the trigger 420. That is, PHR and BSR may be generated and transmitted to the base station 105 based on a time delay between the uplink grant 415 and the trigger 420. In one example, the uplink grant 415 may be received during the first TTI 410-*a*, the trigger 425 may be received during the second TTI 410-*b*, which may be a subframe, and the UE 115 may transmit a latest BSR after the trigger 420 is received. In another example, the UE 115 may transmit the PHR using the fourth TTI 410-*d*, and may also use the fourth TTI 410-*d* as the reference TTI 410 for the PHR (e.g., because the PHR may be generated quickly).

Additionally or alternatively, the UE 115 may generate the PHR or the BSR based on a time difference between receiving the trigger 420 and when the PHR or BSR is transmitted (e.g., a time delay between the second TTI 410-*b* and the fourth TTI 410-*d*). In such cases, if the time delay is greater than a predetermined value the UE 115 may identify a fifth TTI 410 (not shown) as a reference for the PHR, and if the time delay is less than the predetermined value then a different TTI 410 may be used as a reference.

Figure 5:
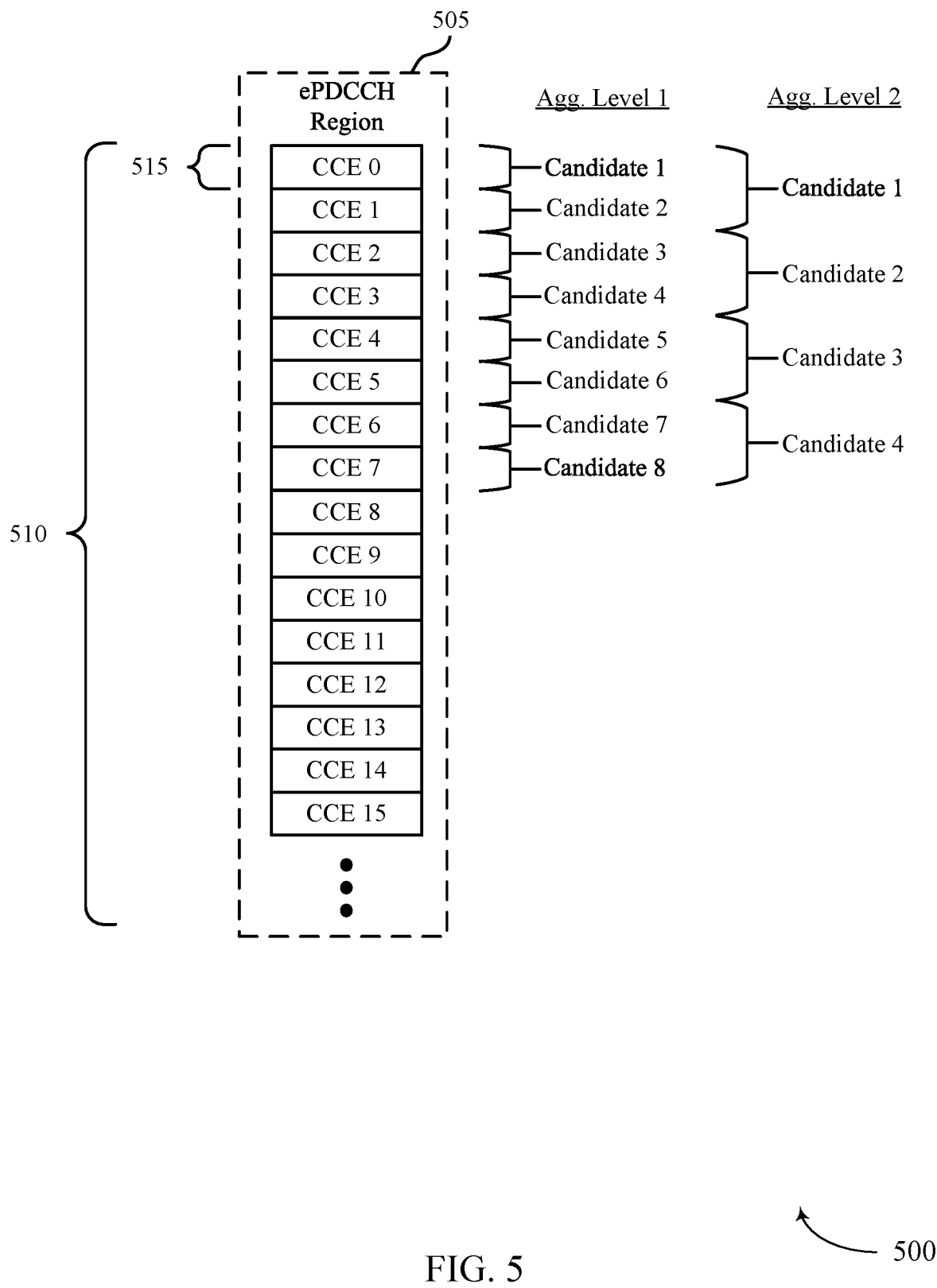
FIG. 5 illustrates an example of decoding candidates in a system that supports power control, reporting techniques, and control channel configuration in unlicensed spectrum and licensed assisted access in accordance with aspects of the present disclosure.

FIG. 5 illustrates an example of decoding candidates 500 in a system that supports power control, reporting techniques, and control channel configuration in shared or unlicensed spectrum and licensed assisted access. Decoding candidates 500 may include an EPDCCH region 505 sent from a base station 105 to a UE 115. That is, EPDCCH region may span a number of TTIs (e.g., downlink subframes) received from a base station 105, such as subframes 205, or TTIs 310, or TTIs 410 as described with reference to FIGS. 2 through 4, respectively. The UE 115 may use the EPDCCH region 505 to identify control channel information, such as DCI, intended for the UE 115. For example, a UE 115 may use a search space 510 that includes a number of CCEs 515 for DCI, where the a DCI format may indicate TPC commands, as described above with reference to FIG. 2.

For simplicity, the search space 510 is depicted as a collection of contiguous CCEs 515 that are numbered consecutively, and search space 510 may include a different number of CCEs 515 than is shown. Each CCE 515 may contain a fixed number of resource elements in non-contiguous locations. Alternatively or additionally, CCEs 515 may be arranged in non-contiguous locations within the resource blocks of one or more downlink control channels. Accordingly, search space 510 may include multiple decoding candidates that the UE 115 may monitor for DCI. Each decoding candidate may correspond to a particular CCE 515 or group of CCEs 515 within search space 510.

With blind decoding, the UE 115 may know that a DCI message may be one of multiple lengths and attempt to decode each of the candidate lengths for each decoding location, and the number of blind decoding candidates may be different for different aggregation levels (e.g., a number of CCEs within an EPDCCH). In some examples, the number of decoding candidates may be a function of an aggregation level, a serving cell index, and a number of transport blocks (TBs) associated with a DCI. That is, a maximum number of decoding candidates may be based on a DCI type included in the EPDCCH region 505, where the DCI type may indicate the number of TBs scheduled by the DCI (i.e., uplink and downlink DCIs). For instance, DCIs that schedule one TB (e.g., using DCI format 1A, 1B, 1D, 0A, 0B, etc.) may correspond to a DCI type 0, where DCIs that schedule two TBs (e.g., using DCI format 2A, 2B, 2C, 2D, 4, 4A, 4B, etc.) may correspond to a DCI type 1. Accordingly, depending on which DCI type is being monitored by the UE 115, the number of candidates being monitored may change. In some examples, the number of decoding candidates may be based on an identifier (ID) associated with the DCI that also corresponds to the number of TBs scheduled. By monitoring decoding candidates based on these different sets or groups of DCI, the total number of candidates used for blind decoding may be reduced. In such cases, particularly for higher aggregation levels, the maximum number of candidates monitored may be less than the total number of candidates within the EPDCCH region 505.

Figure 6:
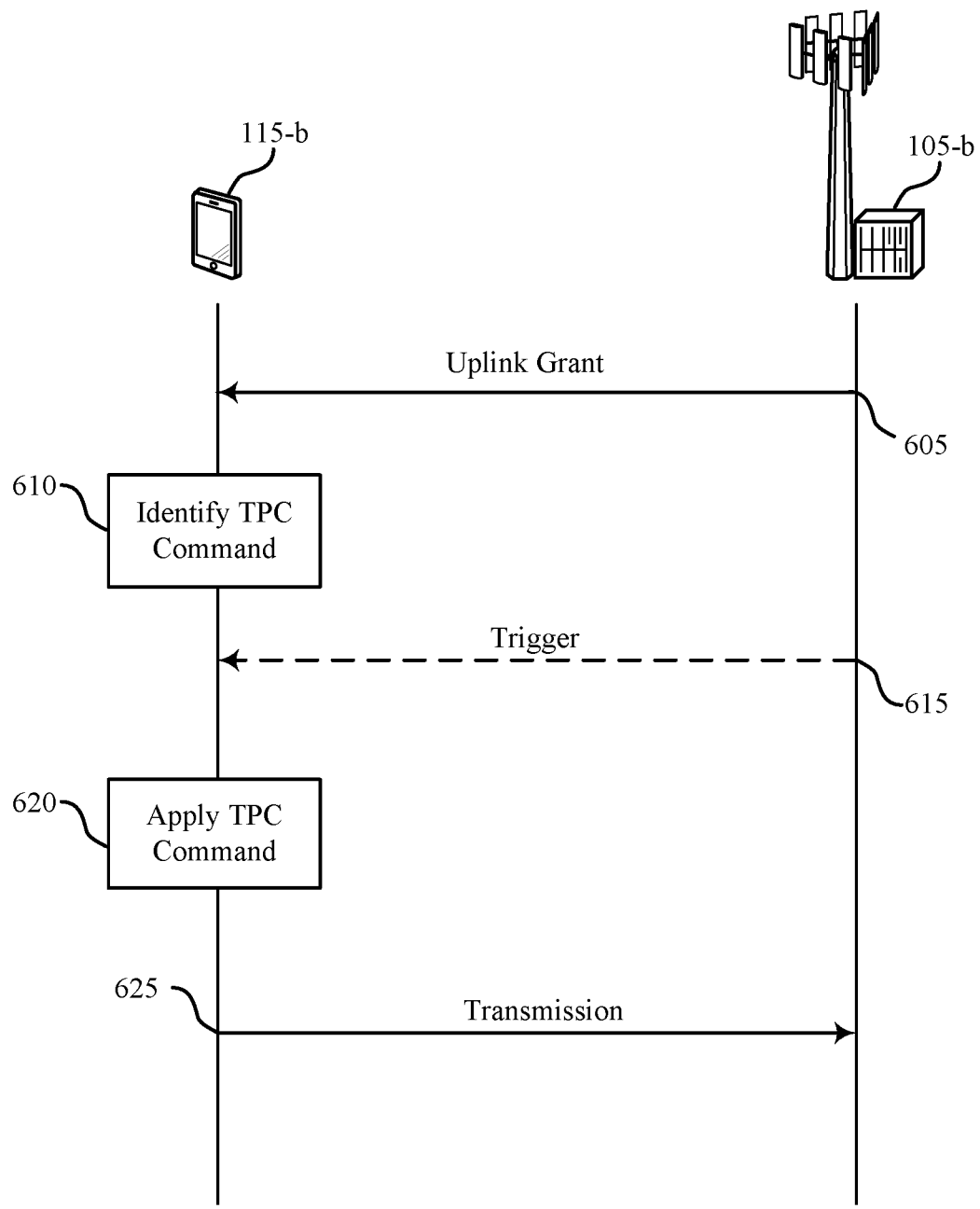
FIGS. 6 through 8 illustrate examples of process flows in a system that supports power control, reporting techniques, and control channel configuration in unlicensed spectrum and licensed assisted access in accordance with aspects of the present disclosure.

FIG. 6 illustrates an example of a process flow 600 in a system that supports power control, reporting techniques, and control channel configuration in shared or unlicensed spectrum and licensed assisted access. Process flow 600 may include a UE 115-*b* and a base station 105-*b*, which may be examples of the corresponding devices described with reference to FIGS. 1 and 2. Process flow may illustrate the application of TPC commands upon receipt of a grant in shared or unlicensed spectrum as described with reference to FIGS. 1-4.

At 605, base station 105-*b* may transmit an uplink grant to UE 115-*b* during a TTI (e.g., a first subframe). The uplink grant may include a first TPC command and an assignment of resources in a shared or an unlicensed radio frequency spectrum band. The TPC may be applied to the assigned resources scheduled during another TTI (e.g., a second subframe). For example, the assignment of resources may indicate a transmission time for the subsequent subframe. In some examples, base station 105-*b* may also transmit DCI that includes a second TPC command. The DCI may, for example, be received on an anchor carrier provided by a PCell operating in licensed spectrum, while the uplink grant may be received on a different component carrier provided by an SCell operating in unlicensed spectrum. Accordingly, at 610, UE 115-*b* may identify the TPC command(s) (e.g., the first TPC command included in the uplink grant, or the second TPC command included in the DCI, or a combination thereof) transmitted by base station 105-*b*.

At 615, base station 105-*b* may optionally transmit a trigger (e.g., a second stage of a two-stage uplink grant) to UE 115-*b* for a transmission on the assigned resources, as indicated by the uplink grant. The trigger may be transmitted by base station 105-*b* during a TTI that precedes the resource assignment (e.g., by a preconfigured or threshold number of TTIs). In some examples, the trigger may be received by UE 115-*b* after TPC is applied (e.g., at 620, as described below).

In some cases, at 615, base station 105-*b* may also transmit DCI that includes another TPC command, which may be sent during the same TTI as the trigger. In some examples, the TPC command transmitted in DCI at 615 may be an alternative to the second TPC command transmitted at 605. For instance, UE 115-*b* may not have received the second TPC command in the DCI at 605. In such cases, TPC commands may be identified by UE 115-*b* after the DCI is received at 615.

At 620, UE 115-*b* may apply the TPC command received at 605 during the TTI corresponding to the assigned resources (e.g., the second subframe). In some examples, the second subframe may be identified based on a time difference between the first subframe and the second subframe. In an example, the second subframe may be four or more subframes after the first subframe. In some cases, the first TPC command may be applied during the second subframe based on UE 115-*b* receiving the trigger at 615. As described above, UE 115-*b* may have received the second TPC command in the DCI at 605. However, in some cases, the first TPC command may conflict with the second TPC command. As a result of such conflicts, UE 115-*b* may drop the second TPC command and apply the first TPC command, which may be based on UE 115-*b* having received the uplink grant and DCI during the same TTI. Additionally or alternatively, UE 115-*b* may drop the second TPC command from the DCI based on having already applied the first TPC command.

At 625, UE 115-*b* may transmit packets to base station 105-*b* in accordance with the TPC command applied at 620 and using the assigned resources. In some examples, the transmission may be sent in response to the received trigger at 615.

Figure 7:
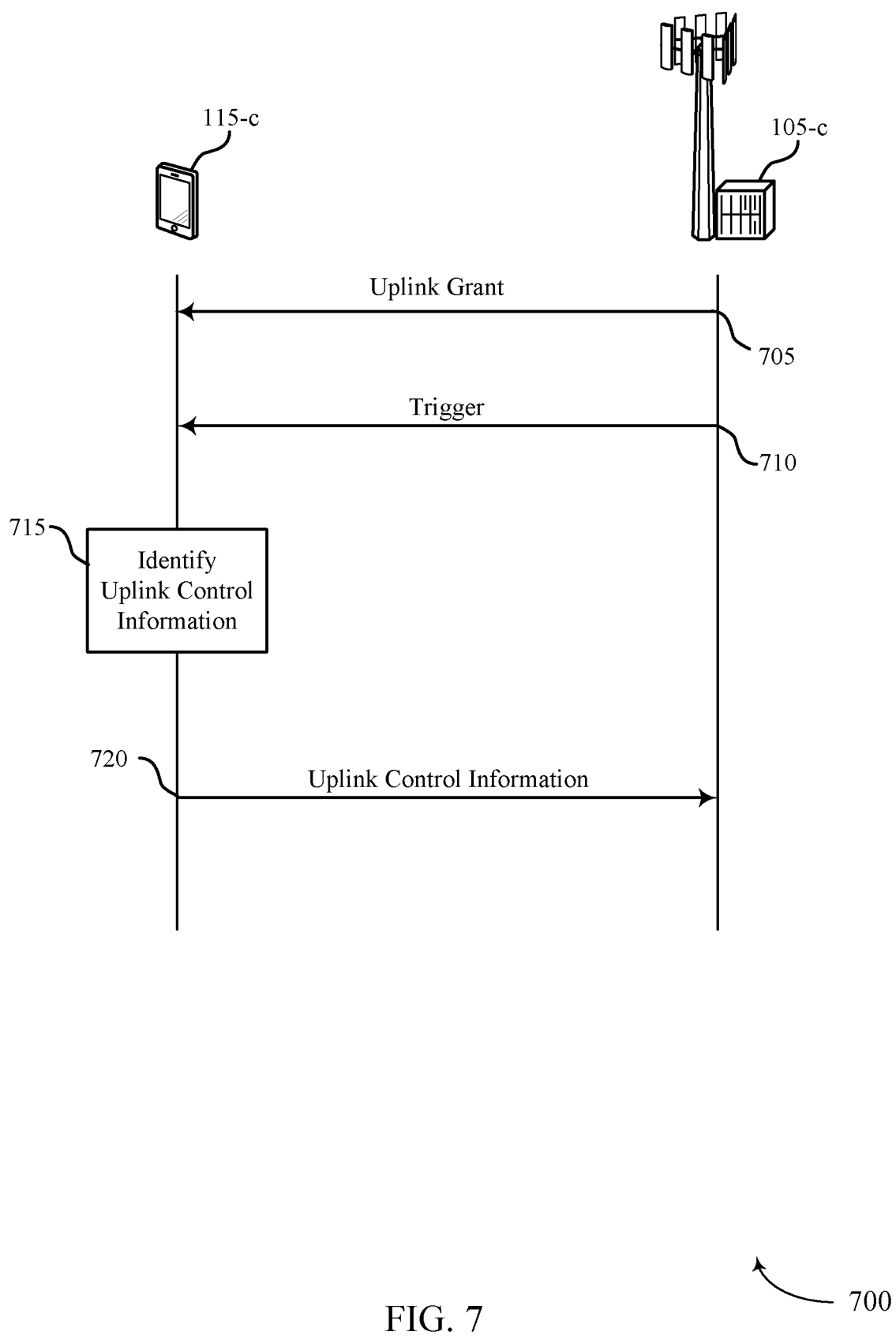

FIG. 7 illustrates an example of a process flow 700 in a system that supports power control, reporting techniques, and control channel configuration in shared or unlicensed spectrum and licensed assisted access. Process flow 700 may include a UE 115-c and a base station 105-c, which may be examples of the corresponding devices described with reference to FIGS. 1 and 2. Process flow 700 may illustrate the transmission of uplink control information based on the receipt of a two-stage grant in shared or unlicensed spectrum.

At 705, base station 105-c may transmit, and UE 115-c may receive, an uplink grant during a TTI (e.g., a first subframe). The uplink grant may comprise a first stage of a two-stage grant, and may include an assignment of resources of a shared or an unlicensed radio frequency spectrum band. At 710, during a subsequent TTI (e.g., a second subframe), base station 105-c may transmit, and UE 115-c may receive, a trigger (e.g., a second stage of the two-stage grant) for an uplink transmission on the assigned resources.

At 715, UE 115-c may identify uplink control information to be transmitted to base station 105-c. The uplink control information may be identified based on a time difference between respective TTIs, such as a time difference between the respective TTIs during which the uplink grant and the trigger were received, or a time difference between other TTIs (e.g., as described above with reference to FIGS. 3, 4, and 6). The uplink control information may include, for example, CSI. In some cases, UE 115-c may further identify a reference TTI for the CSI based on a time difference between the reference TTI and when the uplink grant was received (e.g., the first subframe). Alternatively, UE 115-c may identify the reference TTI based on whether a time difference between respective TTIs exceeds a threshold. For example, a subframe that precedes the second subframe may be identified by UE 115-c as a reference for the CSI, such as in cases where the time difference between the first subframe and the second subframe exceeds the threshold. Additionally or alternatively, if the time difference between respective subframes is less than or equal to the threshold, UE 115-c may identify another, different, TTI as the reference for the CSI.

At 720, UE 115-c may transmit, and base station 105-c may receive, the uplink control information. The uplink control information may be transmitted in response to the trigger. In some examples, the uplink control information may include a PHR that is based on a signal within a certain TTI. The uplink control information may also include a BSR. In some cases, the BSR and the PHR may be multiplexed with uplink data.

Figure 8:
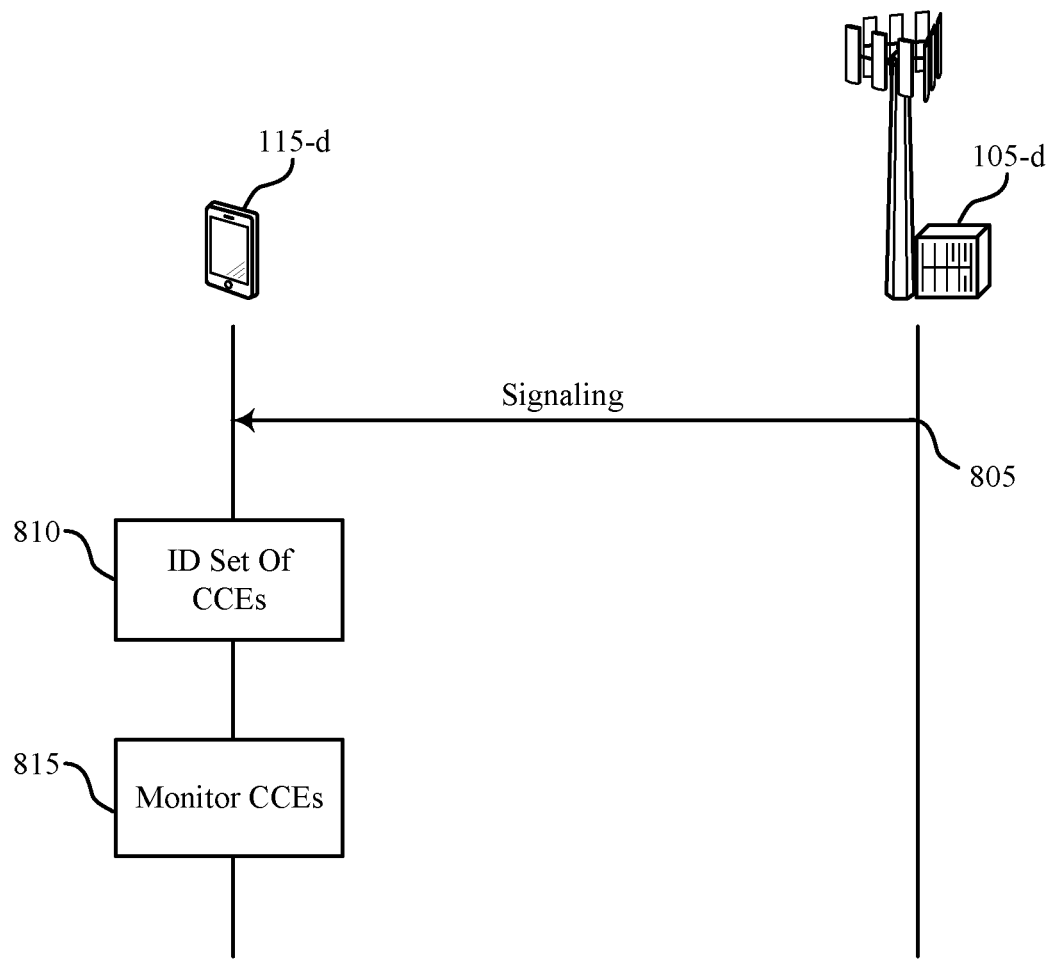

FIG. 8 illustrates an example of a process flow 800 in a system that supports power control, reporting techniques, and control channel configuration in shared or unlicensed spectrum, and licensed assisted access. Process flow 800 may include a UE 115-d and a base station 105-d, which may be examples of the corresponding devices described with reference to FIGS. 1 and 2. Process flow 800 may illustrate the identification of control channel elements within a search space based on grouping of DCI.

At 805, base station 105-d may transmit, and UE 115-d may receive, signaling that configures one or more physical resource block sets for a serving cell. In some cases, the base station 105-d may transmit signaling that configures one or more physical resource block sets for a serving cell. Additionally, base station 105-d may identify, within a search space indicated by the signaling, a set of control channel elements that is based at least in part on a DCI type, the index of the serving cell, and the one or more physical resource block sets. The base station 105-d may then transmit DCI using the set of control channel elements on the serving cell.

At 810, UE 115-d may identify, within a search space indicated by the signaling, a set of control channel elements that is based at least in part on a DCI type, an index of the serving cell, and the one or more physical resource block sets. In some examples, identifying the set of CCEs may include determining a maximum number of control channel candidates to monitor at the aggregation level based at least in part on the DCI type, the index of the serving cell, and the one or more physical resource block sets. In some cases, the DCI type includes a DCI format. Additionally or alternatively, the DCI type may be based on a quantity of transport blocks that DCI is capable of scheduling. In some cases, the DCI type is based at least in part on a payload size of DCI. In some cases, the control channel elements comprises enhanced control channel elements (ECCEs) associated with an EPDCCH.

At 815, UE 115-d may monitor the set of control channel elements on the serving cell. In some cases, the monitoring may include monitoring at an aggregation level associated with the search space, wherein the set of control channel elements is based at least in part on the aggregation level.

Figure 9:
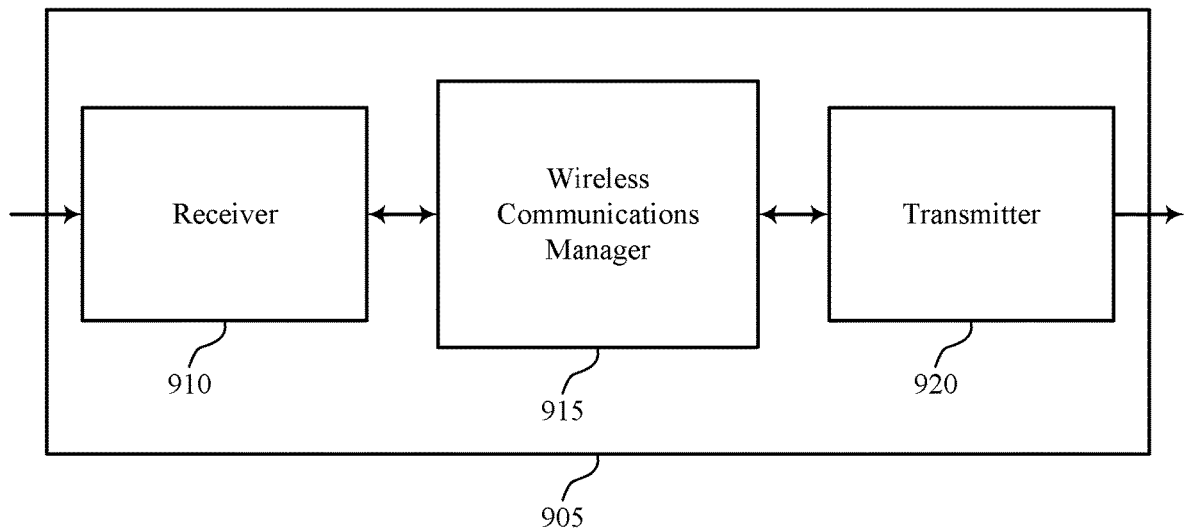
FIGS. 9 through 11 show block diagrams of a device or devices that support power control, reporting techniques, and control channel configuration in unlicensed spectrum and licensed assisted access in accordance with aspects of the present disclosure.

FIG. 9 shows a block diagram 900 of a wireless device 905 that supports power control, reporting techniques, and control channel configuration in shared or unlicensed spectrum and licensed assisted access in accordance with various aspects of the present disclosure. Wireless device 905 may be an example of aspects of a UE 115 as described with reference to FIG. 1. Wireless device 905 may include receiver 910, wireless communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to power control, reporting techniques, and control channel configuration in shared or unlicensed spectrum and licensed assisted access, etc.). Information may be passed on to other components of the device. The receiver 910 may be an example of aspects of the transceiver 1235 described with reference to FIG. 12.

Wireless communications manager 915 may be an example of aspects of the wireless communications manager 1215 described with reference to FIG. 12. Wireless communications manager 915 may receive, during a first TTI, an uplink grant that includes a first transmit power command and an assignment of resources in a shared or an unlicensed radio frequency spectrum band during a second TTI and the assignment of resources may indicate a transmission time for the second TTI. Wireless communications manager 915 may apply the first TPC command during the second TTI and transmit during the second TTI according to the TPC command and the assignment of resources. The wireless communications manager 915 may also receive, during a first TTI, an uplink grant that includes a first TPC command and an assignment of resources in a shared or an unlicensed radio frequency spectrum band, apply, during a second TTI, the first TPC command, where the second TTI is identified based on a time difference between the first TTI and the second TTI, and transmit during the second TTI or a third TTI according to the first TPC command and the assignment of resources.

In some examples, the wireless communications manager 915 may receive, during a first TTI, a first uplink grant that includes an assignment of resources of a shared or an unlicensed radio frequency spectrum band, receive, during a second TTI, a trigger for a transmission on the assigned resources, identify uplink control information based on a time difference between at least one of: the first TTI and the second TTI, the first TTI and a third TTI that precedes the first TTI, or the second TTI and a fourth TTI that is subsequent the second TTI, and transmit the uplink control information during the fourth TTI in response to the trigger.

Transmitter 920 may transmit signals generated by other components of the device. In some examples, the transmitter 920 may be collocated with a receiver 910 in a transceiver module. For example, the transmitter 920 may be an example of aspects of the transceiver 1235 described with reference to FIG. 12. The transmitter 920 may include a single antenna, or it may include a set of antennas.

Figure 10:
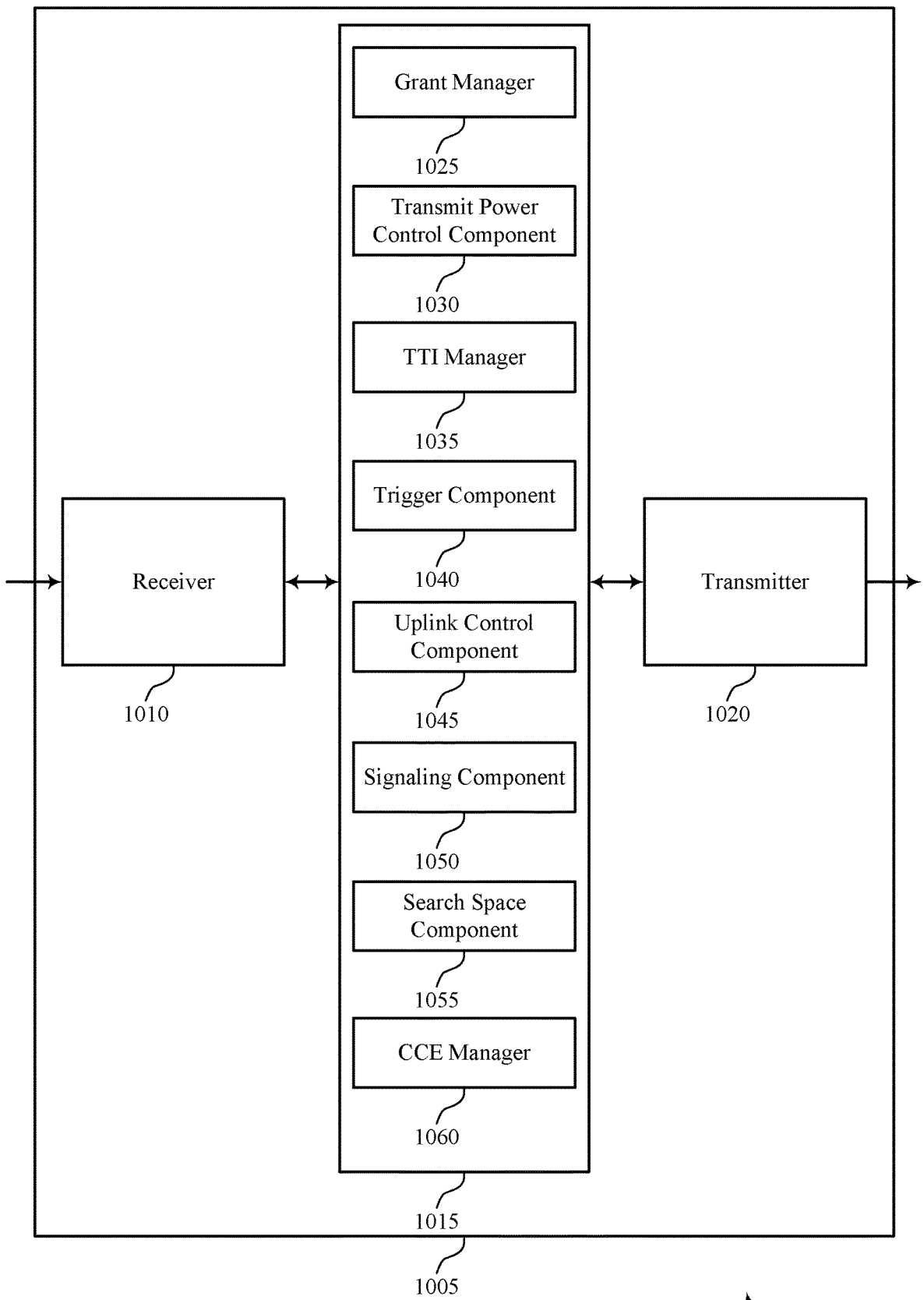

FIG. 10 shows a block diagram 1000 of a wireless device 1005 that supports power control, reporting techniques, and control channel configuration in shared or unlicensed spectrum and licensed assisted access in accordance with various aspects of the present disclosure. Wireless device 1005 may be an example of aspects of a wireless device 905 or a UE 115 as described with reference to FIGS. 1 and 9. Wireless device 1005 may include receiver 1010, wireless communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to power control, reporting techniques, and control channel configuration in a shared or unlicensed spectrum and licensed assisted access, etc.). Information may be passed on to other components of the device. The receiver 1010 may be an example of aspects of the transceiver 1235 described with reference to FIG. 12.

Wireless communications manager 1015 may be an example of aspects of the wireless communications manager 1215 described with reference to FIG. 12. Wireless communications manager 1015 may also include grant manager 1025, transmit power control component 1030, TTI manager 1035, trigger component 1040, uplink control component 1045, signaling component 1050, search space component 1055, and CCE manager 1060.

Grant manager 1025 may receive, during a first TTI, an uplink grant that includes a first transmit power command and an assignment of resources in a shared or an unlicensed radio frequency spectrum band during a second TTI, receive, during a first TTI, an uplink grant that includes a first TPC command and an assignment of resources in a shared or an unlicensed radio frequency spectrum band, and receive, during a first TTI, a first uplink grant that includes an assignment of resources of a shared or an unlicensed radio frequency spectrum band.

Transmit power control component 1030 may apply the first TPC command during the second TTI, drop the second TPC command from the DCI based at least in part on receiving the first uplink grant and the DCI during the first TTI, or may drop the second TPC command from the DCI based at least in part on applying the first TPC command during the second TTI. In some examples, transmit power control component 1030 may apply, during the second TTI, the first TPC command, where the second TTI is identified based on a time difference between the first TTI and the second TTI.

TTI manager 1035 may transmit during the second TTI according to the TPC command and the assignment of resources. Additionally, TTI manager 1035 may transmit during the second TTI or a third TTI according to the first transmit power control command and the assignment of resources. In some examples, TTI manager 1035 may transmit the uplink control information during the fourth TTI in response to the trigger and determine whether the time difference between the first TTI and the second TTI exceeds a threshold. In some cases, the second TTI is at least four TTIs after the first TTI.

Trigger component 1040 may receive, during a third TTI, a trigger for a transmission on the assigned resources, where the first transmit power command is applied during the second TTI based on receiving the trigger, and the transmitting may be in response to the trigger. In some cases, trigger component 1040 may receive, during a fourth TTI, a trigger for a transmission on the assigned resources, where the transmitting is in response to the trigger, and receive, during a second TTI, a trigger for a transmission on the assigned resources. In some cases, the fourth TTI precedes the second TTI. In some cases, the second TTI precedes the fourth TTI.

Uplink control component 1045 may identify uplink control information based on a time difference between at least one of: the first TTI and the second TTI, the first TTI and a third TTI that precedes the first TTI, or the second TTI and a fourth TTI that is subsequent the second TTI. In some cases, the uplink control information includes CSI. In some cases, the uplink control information includes CSI. In some cases, the uplink control information includes a power headroom report that is based on a signal within the fourth TTI. In some cases, the uplink control information includes a power headroom report that is based on a signal within a fifth TTI, where the fifth TTI is identified based on the time difference between the second TTI and the fourth TTI. In some cases, the uplink control information includes a buffer status report, where the buffer status report is multiplexed with uplink data.

Signaling component 1050 may receive signaling that configures one or more physical resource block sets for a serving cell and receive signaling that configures a LAA carrier on resources of a shared or an unlicensed radio frequency spectrum band, where the serving cell includes the LAA carrier.

Search space component 1055 may identify, within a search space indicated by the signaling, a set of control channel elements that is based on a DCI type, an index of the serving cell, and the one or more physical resource block sets. In some examples, search space component 1055 may receive signaling that indicates a difference in a number of control channel candidates between scheduled cells, where the difference is based on cross-carrier scheduling, and where the set of control channel elements is monitored based on the difference. In some cases, identifying the set of control channel elements includes: determining a maximum number of control channel candidates to monitor at the aggregation level based on the DCI type, the index of the serving cell, and the one or more physical resource block sets. In some cases, the DCI type includes a DCI format. In some cases, the DCI type is based on a quantity of transport blocks that DCI is capable of scheduling. In some cases, the DCI type is based on a payload size of DCI.

CCE manager 1060 may monitor the set of control channel elements on the serving cell. In some cases, the monitoring includes: monitoring at an aggregation level associated with the search space, where the set of control channel elements is based on the aggregation level. In some cases, the control channel elements includes enhanced control channel elements (enhanced component carrier (EC-CEs) associated with an enhanced physical downlink control channel (PDCCH).

Transmitter 1020 may transmit signals generated by other components of the device. In some examples, the transmitter 1020 may be collocated with a receiver 1010 in a transceiver module. For example, the transmitter 1020 may be an example of aspects of the transceiver 1235 described with reference to FIG. 12. The transmitter 1020 may include a single antenna, or it may include a set of antennas.

Figure 11:
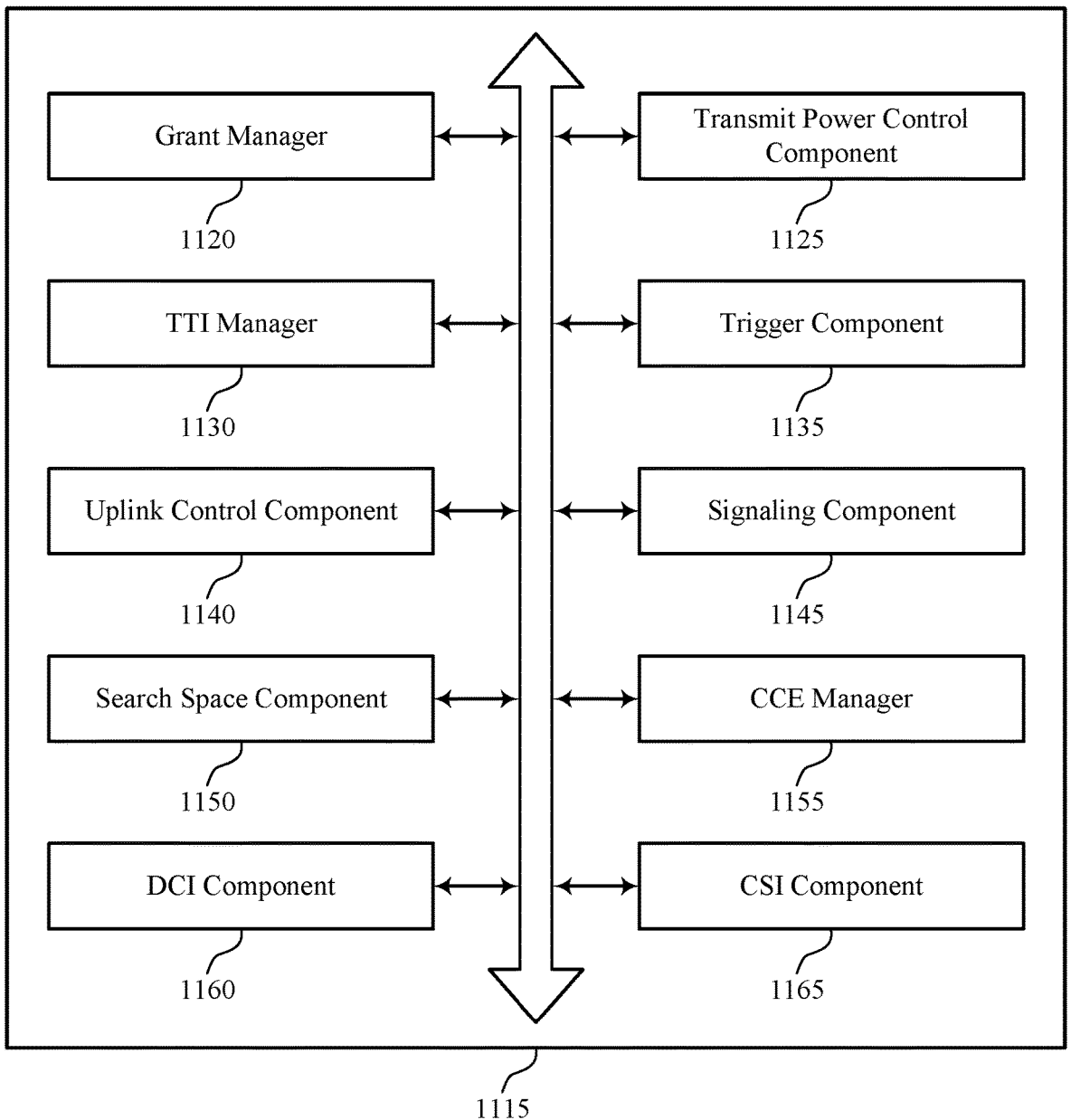

FIG. 11 shows a block diagram 1100 of a wireless communications manager 1115 that supports power control, reporting techniques, and control channel configuration in shared or unlicensed spectrum and licensed assisted access in accordance with various aspects of the present disclosure. The wireless communications manager 1115 may be an example of aspects of a wireless communications manager 915, a wireless communications manager 1015, or a wireless communications manager 1215 described with reference to FIGS. 9, 10, and 12. The wireless communications manager 1115 may include grant manager 1120, transmit power control component 1125, TTI manager 1130, trigger component 1135, uplink control component 1140, signaling component 1145, search space component 1150, CCE manager 1155, DCI component 1160, and CSI component 1165. Each of these modules may communicate, directly or indirectly, with one another (e.g., via one or more buses).

Grant manager 1120 may receive, during a first TTI, an uplink grant that includes a first transmit power command and an assignment of resources in a shared or an unlicensed radio frequency spectrum band during a second TTI, receive, during a first TTI, an uplink grant that includes a first TPC command and an assignment of resources in a shared or an unlicensed radio frequency spectrum band, and receive, during a first TTI, a first uplink grant that includes an assignment of resources of a shared or an unlicensed radio frequency spectrum band.

Transmit power control component 1125 may apply the first TPC command during the second TTI, drop the second TPC command from the DCI based at least in part on receiving the first uplink grant and the DCI during the first TTI, or may drop the second TPC command from the DCI based at least in part on applying the first TPC command during the second TTI. In some examples, transmit power control component 1125 may apply, during the second TTI, the first TPC command, where the second TTI is identified based on a time difference between the first TTI and the second TTI.

TTI manager 1130 may transmit during the second TTI according to the TPC command and the assignment of resources. Additionally, TTI manager 1130 may transmit during the second TTI or a third TTI according to the first transmit power control command and the assignment of resources. In some examples, TTI manager 1130 may transmit the uplink control information during the fourth TTI in response to the trigger and determine whether the time difference between the first TTI and the second TTI exceeds a threshold. In some cases, the second TTI is at least four TTIs after the first TTI.

Trigger component 1135 may receive, during a third TTI, a trigger for a transmission on the assigned resources, where the first transmit power command is applied during the second TTI based on receiving the trigger, and where the transmitting is in response to the trigger, receive, during a fourth TTI, a trigger for a transmission on the assigned resources, where the transmitting is in response to the trigger, and receive, during a second TTI, a trigger for a transmission on the assigned resources. In some cases, the fourth TTI precedes the second TTI. In some cases, the second TTI precedes the fourth TTI.

Uplink control component 1140 may identify uplink control information based on a time difference between at least one of: the first TTI and the second TTI, the first TTI and a third TTI that precedes the first TTI, or the second TTI and a fourth TTI that is subsequent the second TTI. In some cases, the uplink control information includes CSI. In some cases, the uplink control information includes CSI. In some cases, the uplink control information includes a power headroom report that is based on a signal within the fourth TTI. In some cases, the uplink control information includes a power headroom report that is based on a signal within a fifth TTI, where the fifth TTI is identified based on the time difference between the second TTI and the fourth TTI. In some cases, the uplink control information includes a buffer status report, and the buffer status report may be multiplexed with uplink data.

Signaling component 1145 may receive signaling that configures one or more physical resource block sets for a serving cell and receive signaling that configures a LAA carrier on resources of a shared or an unlicensed radio frequency spectrum band, where the serving cell includes the LAA carrier.

Search space component 1150 may identify, within a search space indicated by the signaling, a set of control channel elements that is based on a DCI type, an index of the serving cell, and the one or more physical resource block sets. In some examples, search space component 1150 may receive signaling that indicates a difference in a number of control channel candidates between scheduled cells, where the difference is based on cross-carrier scheduling, and where the set of control channel elements is monitored based on the difference. In some cases, identifying the set of control channel elements includes: determining a maximum number of control channel candidates to monitor at the aggregation level based on the DCI type, the index of the serving cell, and the one or more physical resource block sets. In some cases, the DCI type includes a DCI format. In some cases, the DCI type is based on a quantity of transport blocks that DCI is capable of scheduling. In some cases, the DCI type is based on a payload size of DCI.

CCE manager 1155 may monitor the set of control channel elements on the serving cell. In some cases, the monitoring includes: monitoring at an aggregation level associated with the search space, where the set of control channel elements is based on the aggregation level. In some cases, the control channel elements includes ECCEs associated with an EPDCCH.

DCI component 1160 may receive, during the first TTI, DCI that includes a second TPC command, receive, during a third TTI that precedes the second TTI by a threshold number of TTIs, DCI that includes a second TPC command, and receive, during a fifth TTI that precedes the second TTI by a threshold number of TTIs, DCI that includes a second TPC command.

CSI component 1165 may identify the third TTI as a reference for the CSI based on the time difference between the first TTI and the third TTI, identify a fifth TTI as a reference for the CSI when the time difference between the first TTI and the second TTI exceeds the threshold, where the fifth TTI precedes the second TTI, and identify the third TTI as the reference for the CSI when the time difference between the first TTI and the second TTI is less than or equal to the threshold.

Figure 12:
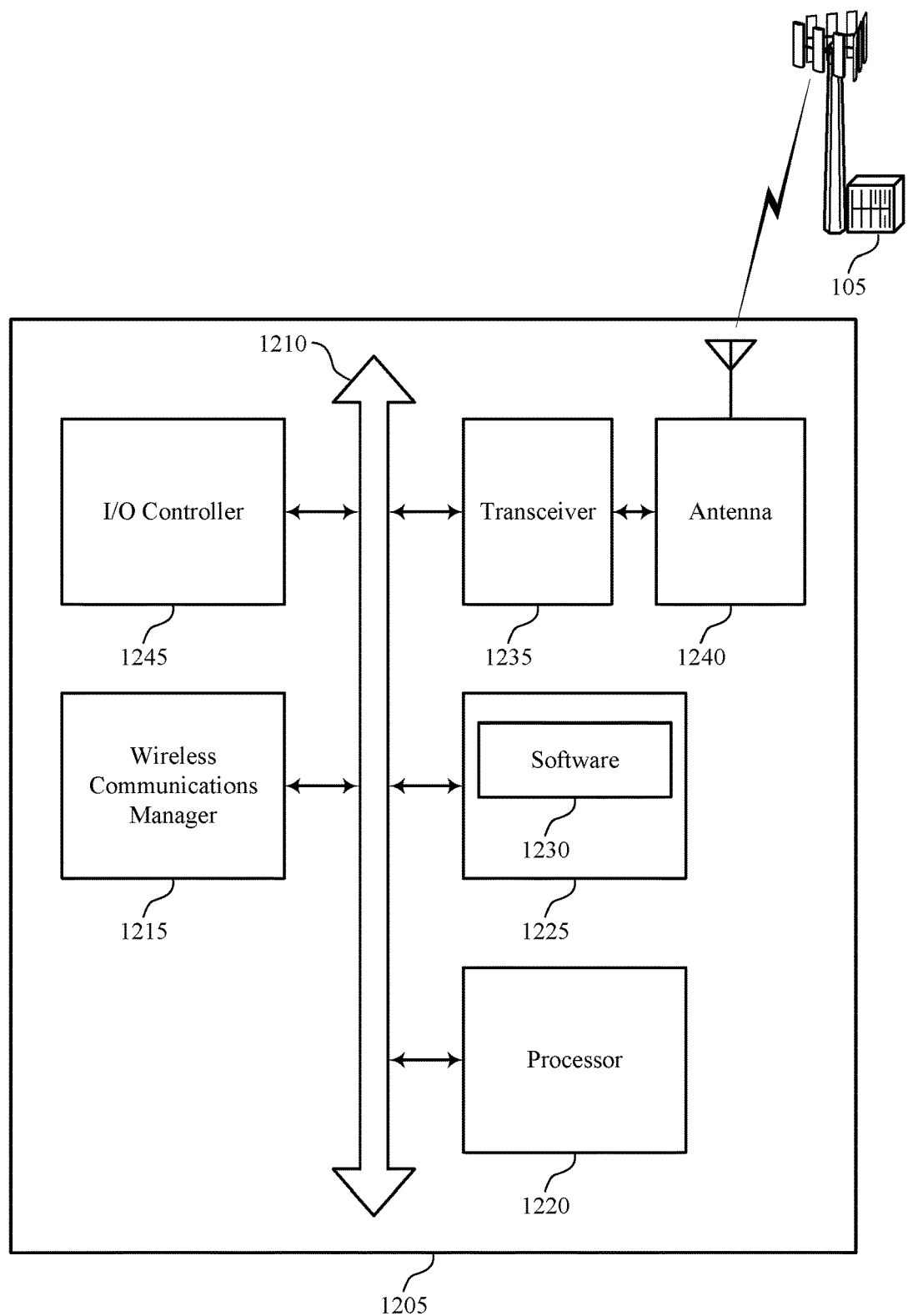
FIG. 12 illustrates a block diagram of a system including a UE that supports power control, reporting techniques, and control channel configuration in unlicensed spectrum and licensed assisted access in accordance with aspects of the present disclosure.

FIG. 12 shows a diagram of a system 1200 including a device 1205 that supports power control, reporting techniques, and control channel configuration in shared or unlicensed spectrum and licensed assisted access in accordance with various aspects of the present disclosure. Device 1205 may be an example of or include the components of wireless device 905, wireless device 1005, or a UE 115 as described above, e.g., with reference to FIGS. 1, 9 and 10. Device 1205 may include components for bi-directional voice and data communications including components for transmitting and receiving communications, including wireless communications manager 1215, processor 1220, memory 1225, software 1230, transceiver 1235, antenna 1240, and I/O controller 1245. These components may be in electronic communication via one or more busses (e.g., bus 1210). Device 1205 may communicate wirelessly with one or more base stations 105.

Processor 1220 may include an intelligent hardware device, (e.g., a general-purpose processor, a digital signal processor (DSP), a central processing unit (CPU), a microcontroller, an application-specific integrated circuit (ASIC), an field-programmable gate array (FPGA), a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting power control, reporting techniques, and control channel configuration in shared or unlicensed spectrum and licensed assisted access).

Memory 1225 may include random access memory (RAM) and read only memory (ROM). The memory 1225 may store computer-readable, computer-executable software 1230 including instructions that, when executed, cause the processor to perform various functions described herein. In some cases, the memory 1225 may contain, among other things, a basic input/output system (BIOS) which may control basic hardware and/or software operation such as the interaction with peripheral components or devices.

Software 1230 may include code to implement aspects of the present disclosure, including code to support power control, reporting techniques, and control channel configuration in shared or unlicensed spectrum and licensed assisted access. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas.

In some cases, the wireless device may include a single antenna 1240. However, in some cases the device may have more than one antenna 1240, which may be capable of concurrently transmitting or receiving multiple wireless transmissions. I/O controller 1245 may manage input and output signals for device 1205. I/O controller 1245 may also manage peripherals not integrated into device 1205. In some cases, I/O controller 1245 may represent a physical connection or port to an external peripheral. In some cases, I/O controller 1245 may utilize an operating system such as iOS®, ANDROID®, MS-DOS®, MS-WINDOWS®, OS/2®, UNIX®, LINUX®, or another known operating system.

Figure 13:
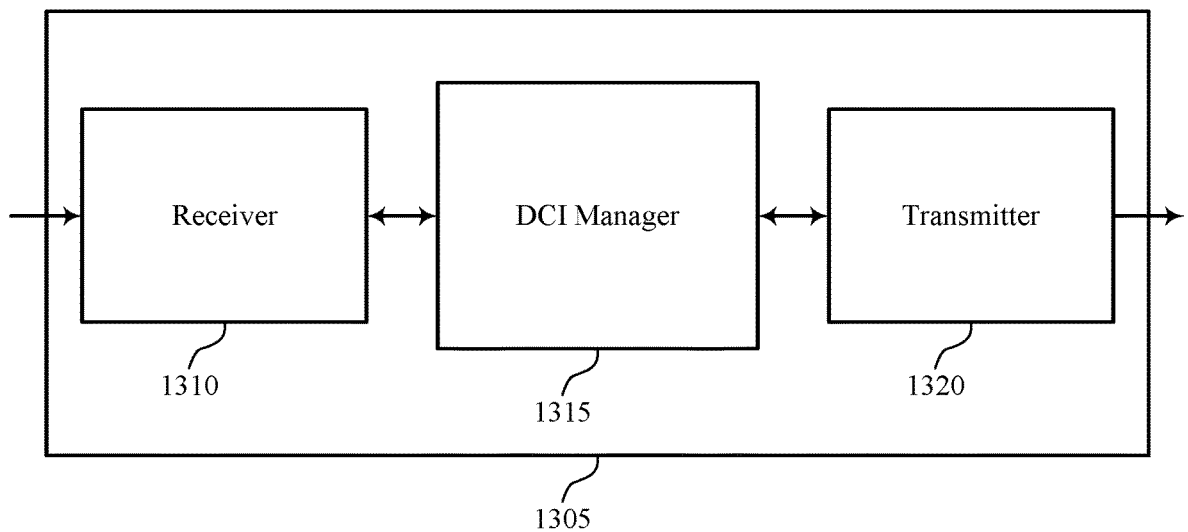
FIG. 13 shows block diagrams of a device that supports power control and reporting techniques for two-stage grants in accordance with aspects of the present disclosure.

FIG. 13 shows a block diagram 1300 of a wireless device 1305 that supports power control and reporting techniques for two-stage grants in accordance with various aspects of the present disclosure. Wireless device 1305 may be an example of aspects of a base station 105 as described with reference to FIG. 1. Wireless device 1305 may include receiver 1310, DCI manager 1315, and transmitter 1320. Wireless device 1305 may also include a processor. Each of these components may be in communication with one another (e.g., via one or more buses).

Receiver 1310 may receive information such as packets, user data, or control information associated with various information channels (e.g., control channels, data channels, and information related to power control and reporting techniques for two-stage grants, etc.). Information may be passed on to other components of the device. The receiver 1310 may be an example of aspects of the transceiver 1435 described with reference to FIG. 14.

DCI manager 1315 may be an example of aspects of the DCI manager 1415 described with reference to FIG. 14. DCI manager 1315 may transmit signaling that configures one or more physical resource block sets for a serving cell, identify, within a search space indicated by the signaling, a set of control channel elements that is based on a DCI type, an index of the serving cell, and the one or more physical resource block sets, and transmit DCI using the set of control channel elements on the serving cell.

Transmitter 1320 may transmit signals generated by other components of the device. In some examples, the transmitter 1320 may be collocated with a receiver 1310 in a transceiver module. For example, the transmitter 1320 may be an example of aspects of the transceiver 1635 described with reference to FIG. 16. The transmitter 1320 may include a single antenna, or it may include a set of antennas.

Figure 14:
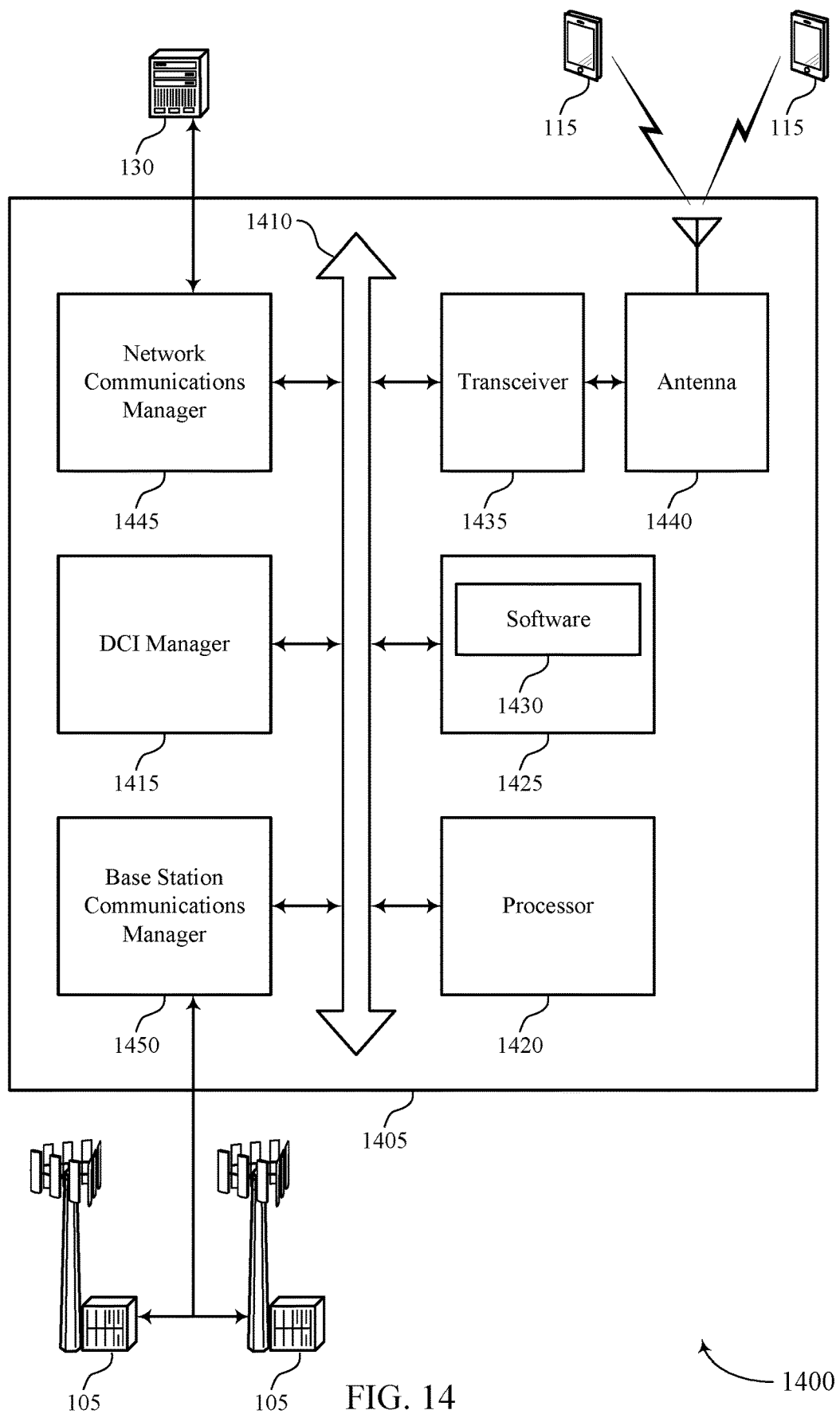
FIG. 14 illustrates a block diagram of a system including a base station that supports power control and reporting techniques for two-stage grants in accordance with aspects of the present disclosure.

FIG. 14 shows a diagram of a system 1400 including a device 1405 that supports power control and reporting techniques for two-stage grants in accordance with various aspects of the present disclosure. Device 1405 may be an example of or include the components of base station 105 as described above, e.g., with reference to FIG. 1. Device 1405 may include components for bi-directional voice and data communications including components for transmitting and receiving communications, including DCI manager 1415, processor 1420, memory 1425, software 1430, transceiver 1435, antenna 1440, network communications manager 1445, and base station communications manager 1450. These components may be in electronic communication via one or more busses (e.g., bus 1410). Device 1405 may communicate wirelessly with one or more UEs 115.

Processor 1420 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1420 may be configured to operate a memory array using a memory controller. In other cases, a memory controller may be integrated into processor 1420. Processor 1420 may be configured to execute computer-readable instructions stored in a memory to perform various functions (e.g., functions or tasks supporting power control and reporting techniques for two-stage grants).

Memory 1425 may include RAM and ROM. The memory 1425 may store computer-readable, computer-executable software 1430 including instructions that, when executed, cause the processor to perform various functions described herein. In some cases, the memory 1425 may contain, among other things, a BIOS which may control basic hardware and/or software operation such as the interaction with peripheral components or devices.

Software 1430 may include code to implement aspects of the present disclosure, including code to support power control and reporting techniques for two-stage grants. Software 1430 may be stored in a non-transitory computer-readable medium such as system memory or other memory. In some cases, the software 1430 may not be directly executable by the processor but may cause a computer (e.g., when compiled and executed) to perform functions described herein.

Transceiver 1435 may communicate bi-directionally, via one or more antennas, wired, or wireless links as described above. For example, the transceiver 1435 may represent a wireless transceiver and may communicate bi-directionally with another wireless transceiver. The transceiver 1435 may also include a modem to modulate the packets and provide the modulated packets to the antennas for transmission, and to demodulate packets received from the antennas.

In some cases, the wireless device may include a single antenna 1440. However, in some cases the device may have more than one antenna 1440, which may be capable of concurrently transmitting or receiving multiple wireless transmissions. Network communications manager 1445 may manage communications with the core network (e.g., via one or more wired backhaul links). For example, the network communications manager 1445 may manage the transfer of data communications for client devices, such as one or more UEs 115.

Base station communications manager 1450 may manage communications with other base station 105, and may include a controller or scheduler for controlling communications with UEs 115 in cooperation with other base stations 105. For example, the base station communications manager 1450 may coordinate scheduling for transmissions to UEs 115 for various interference mitigation techniques such as beamforming or joint transmission. In some examples, base station communications manager 1450 may provide an X2 interface within an LTE/LTE-A wireless communication network technology to provide communication between base stations 105.

Figure 15:
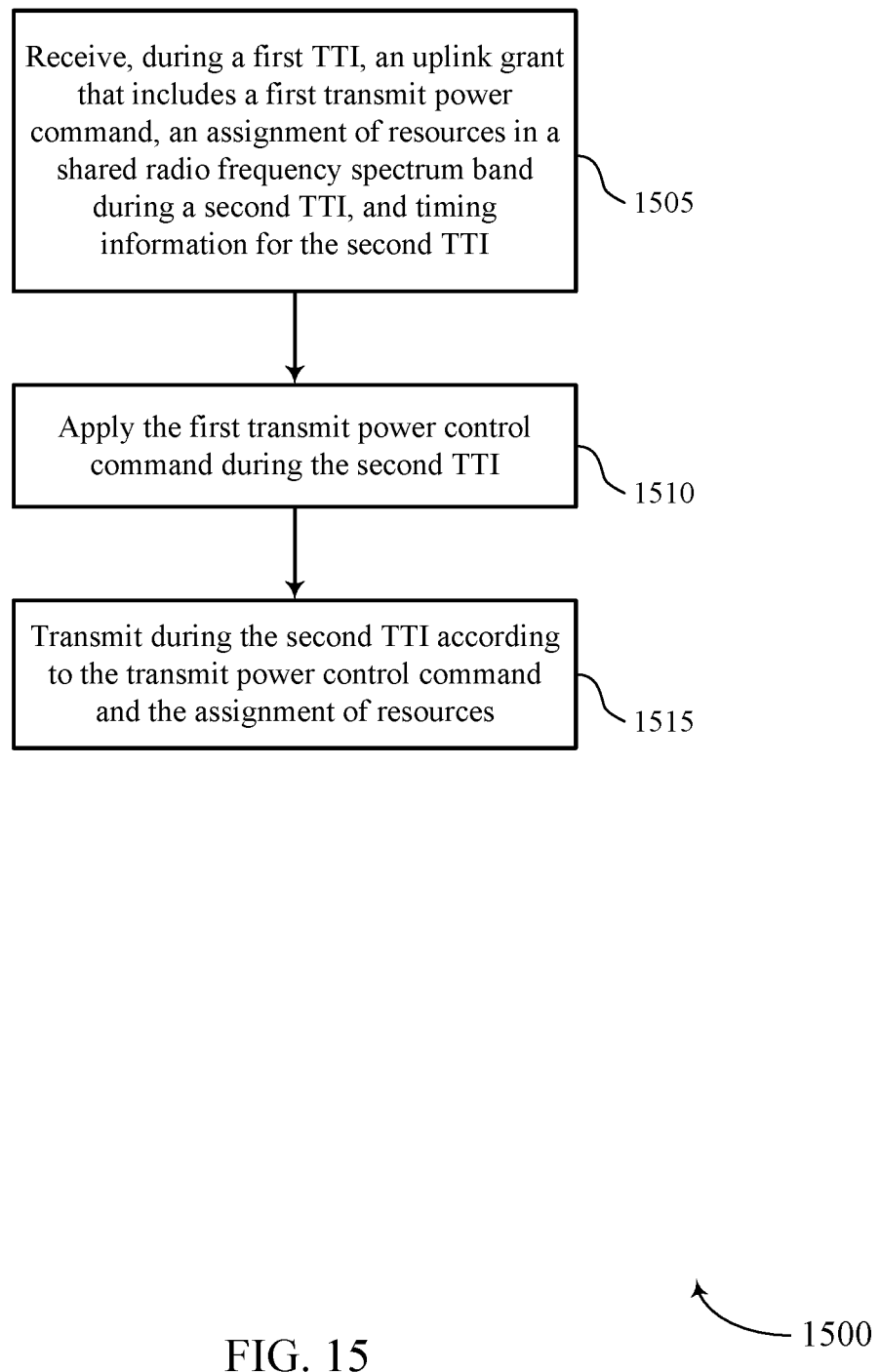
FIGS. 15 through 20 illustrate methods for power control, reporting techniques, and control channel configuration in unlicensed spectrum and licensed assisted access in accordance with aspects of the present disclosure.

FIG. 15 shows a flowchart illustrating a method 1500 for power control, reporting techniques, and control channel configuration in shared or unlicensed spectrum and licensed assisted access in accordance with various aspects of the present disclosure. The operations of method 1500 may be implemented by a UE 115 or its components as described herein. For example, the operations of method 1500 may be performed by a wireless communications manager as described with reference to FIGS. 9 through 12. In some examples, a UE 115 may execute a set of codes to control the functional elements of the device to perform the functions described below. Additionally or alternatively, the UE 115 may perform aspects of the functions described below using special-purpose hardware.

At block 1505 the UE 115 may receive, during a first TTI, an uplink grant that includes a first transmit power command, an assignment of resources in a shared or an unlicensed radio frequency spectrum band during a second TTI, and timing information for the second TTI. The operations of block 1505 may be performed according to the methods described with reference to FIGS. 1 through 7. In certain examples, aspects of the operations of block 1505 may be performed by a grant manager as described with reference to FIGS. 9 through 12.

At block 1510 the UE 115 may apply the first TPC command during the second TTI. The operations of block 1510 may be performed according to the methods described with reference to FIGS. 1 through 7. In certain examples, aspects of the operations of block 1510 may be performed by a transmit power control component as described with reference to FIGS. 9 through 12.

At block 1515 the UE 115 may transmit during the second TTI according to the TPC command and the assignment of resources. The operations of block 1515 may be performed according to the methods described with reference to FIGS. 1 through 7. In certain examples, aspects of the operations of block 1515 may be performed by a TTI manager as described with reference to FIGS. 9 through 12.

Figure 16:
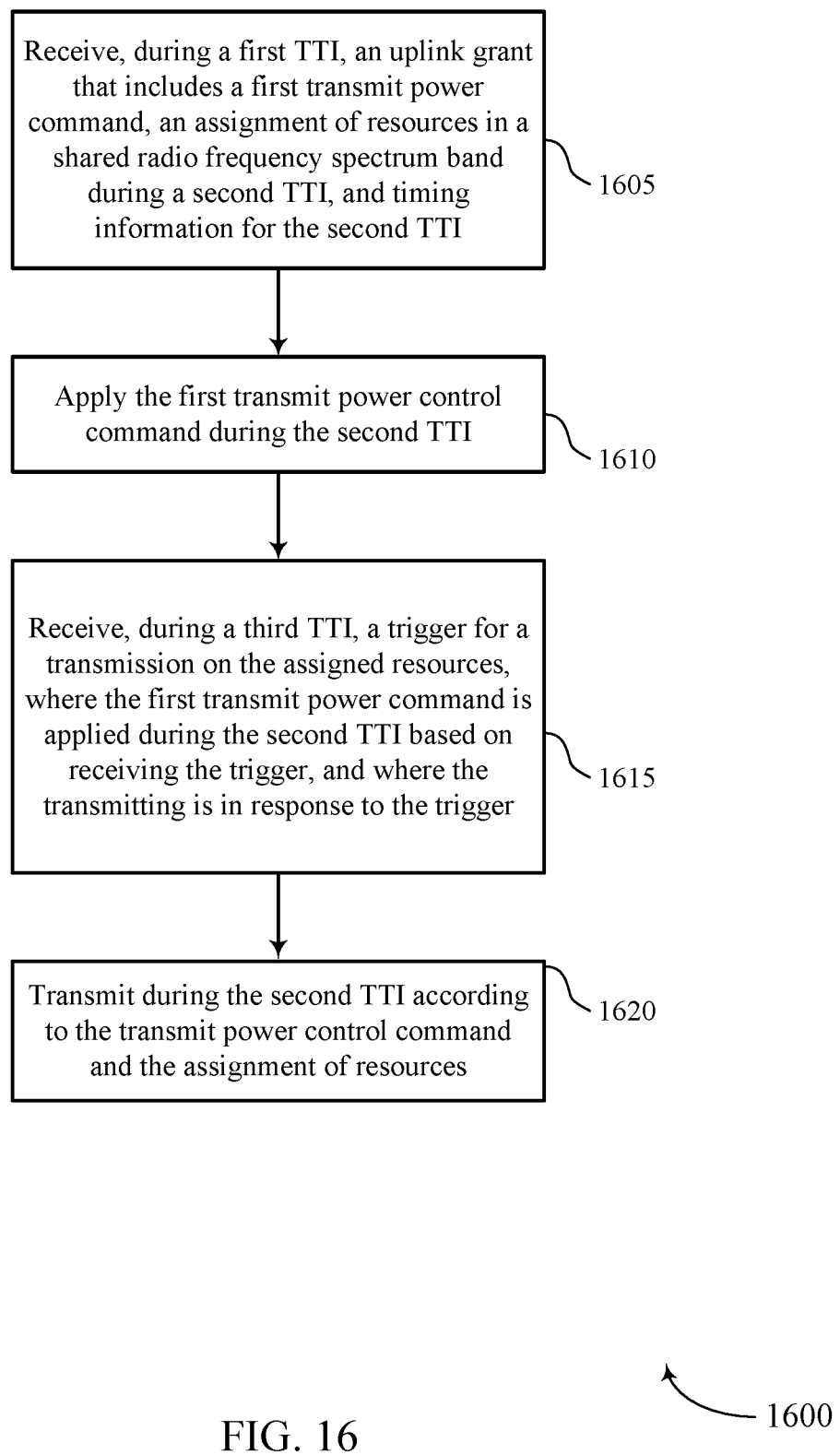

FIG. 16 shows a flowchart illustrating a method 1600 for power control, reporting techniques, and control channel configuration in shared or unlicensed spectrum and licensed assisted access in accordance with various aspects of the present disclosure. The operations of method 1600 may be implemented by a UE 115 or its components as described herein. For example, the operations of method 1600 may be performed by a wireless communications manager as described with reference to FIGS. 9 through 12. In some examples, a UE 115 may execute a set of codes to control the functional elements of the device to perform the functions described below. Additionally or alternatively, the UE 115 may perform aspects of the functions described below using special-purpose hardware.

At block 1605 the UE 115 may receive, during a first TTI, an uplink grant that includes a first transmit power command, an assignment of resources in a shared or an unlicensed radio frequency spectrum band during a second TTI, and timing information for the second TTI. The operations of block 1605 may be performed according to the methods described with reference to FIGS. 1 through 7. In certain examples, aspects of the operations of block 1605 may be performed by a grant manager as described with reference to FIGS. 9 through 12.

At block 1610 the UE 115 may apply the first TPC command during the second TTI. The operations of block 1610 may be performed according to the methods described with reference to FIGS. 1 through 7. In certain examples, aspects of the operations of block 1610 may be performed by a transmit power control component as described with reference to FIGS. 9 through 12.

At block 1615 the UE 115 may receive, during a third TTI, a trigger for a transmission on the assigned resources, wherein the first transmit power command is applied during the second TTI based at least in part on receiving the trigger, and wherein the transmitting is in response to the trigger. The third TTI may precede the second TTI. The operations of block 1620 may be performed according to the methods described with reference to FIGS. 1 through 7. In certain examples, aspects of the operations of block 1620 may be performed by a trigger component as described with reference to FIGS. 9 through 12.

At block 1620 the UE 115 may transmit during the second TTI according to the TPC command and the assignment of resources. The operations of block 1615 may be performed according to the methods described with reference to FIGS. 1 through 7. In certain examples, aspects of the operations of block 1615 may be performed by a TTI manager as described with reference to FIGS. 9 through 12.

Figure 17:
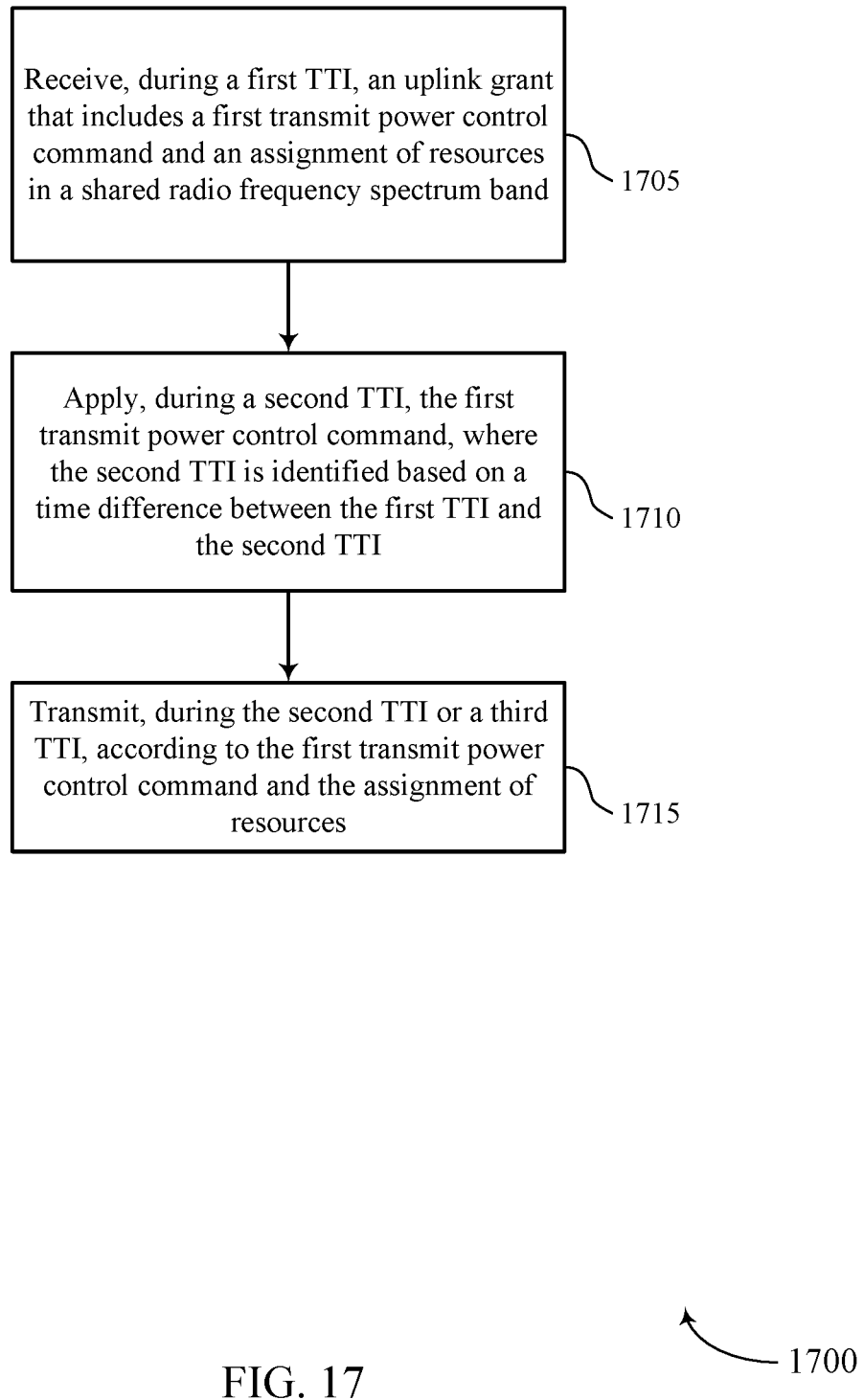

FIG. 17 shows a flowchart illustrating a method 1700 for power control, reporting techniques, and control channel configuration in shared or unlicensed spectrum and licensed assisted access in accordance with various aspects of the present disclosure. The operations of method 1700 may be implemented by a UE 115 or its components as described herein. For example, the operations of method 1700 may be performed by a wireless communications manager as described with reference to FIGS. 9 through 12. In some examples, a UE 115 may execute a set of codes to control the functional elements of the device to perform the functions described below. Additionally or alternatively, the UE 115 may perform aspects of the functions described below using special-purpose hardware.

At block 1705 the UE 115 may receive, during a first TTI, an uplink grant that includes a first TPC command and an assignment of resources in a shared or an unlicensed radio frequency spectrum band. The operations of block 1705 may be performed according to the methods described with reference to FIGS. 1 through 7. In certain examples, aspects of the operations of block 1705 may be performed by a grant manager as described with reference to FIGS. 9 through 12.

At block 1710 the UE 115 may apply, during a second TTI, the first TPC command, wherein the second TTI is identified based at least in part on a time difference between the first TTI and the second TTI. The operations of block 1710 may be performed according to the methods described with reference to FIGS. 1 through 7. In certain examples, aspects of the operations of block 1710 may be performed by a transmit power control component as described with reference to FIGS. 9 through 12.

At block 1715 the UE 115 may transmit, during the second TTI or a third TTI, according to the first TPC command and the assignment of resources. The operations of block 1715 may be performed according to the methods described with reference to FIGS. 1 through 7. In certain examples, aspects of the operations of block 1715 may be performed by a TTI manager as described with reference to FIGS. 9 through 12.

Figure 18:
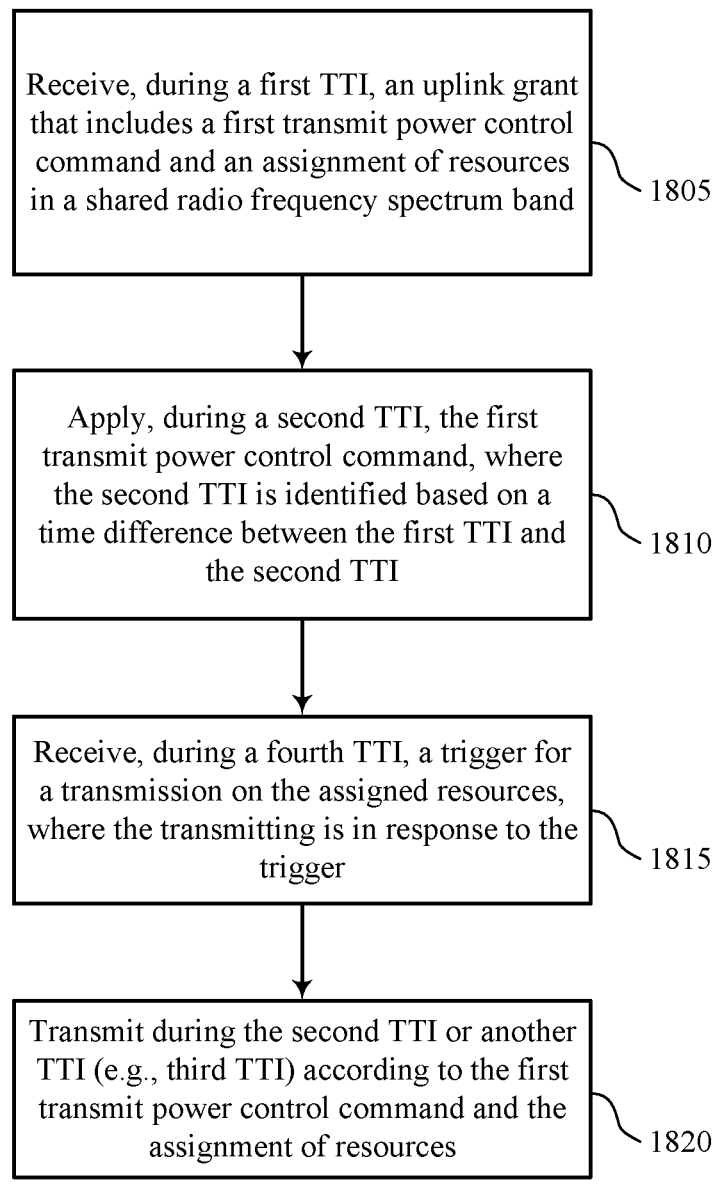

FIG. 18 shows a flowchart illustrating a method 1800 for power control, reporting techniques, and control channel configuration in shared or unlicensed spectrum and licensed assisted access in accordance with various aspects of the present disclosure. The operations of method 1800 may be implemented by a UE 115 or its components as described herein. For example, the operations of method 1800 may be performed by a wireless communications manager as described with reference to FIGS. 9 through 12. In some examples, a UE 115 may execute a set of codes to control the functional elements of the device to perform the functions described below. Additionally or alternatively, the UE 115 may perform aspects of the functions described below using special-purpose hardware.

At block 1805 the UE 115 may receive, during a first TTI, an uplink grant that includes a first TPC command and an assignment of resources in a shared or an unlicensed radio frequency spectrum band. The operations of block 1805 may be performed according to the methods described with reference to FIGS. 1 through 7. In certain examples, aspects of the operations of block 1805 may be performed by a grant manager as described with reference to FIGS. 9 through 12.

At block 1810 the UE 115 may apply, during a second TTI, the first TPC command, wherein the second TTI is identified based at least in part on a time difference between the first TTI and the second TTI. The operations of block 1810 may be performed according to the methods described with reference to FIGS. 1 through 7. In certain examples, aspects of the operations of block 1810 may be performed by a transmit power control component as described with reference to FIGS. 9 through 12.

At block 1815 the UE 115 may receive, during a fourth TTI, a trigger for a transmission on the assigned resources, wherein the transmitting is in response to the trigger. The operations of block 1820 may be performed according to the methods described with reference to FIGS. 1 through 7. In certain examples, aspects of the operations of block 1820 may be performed by a trigger component as described with reference to FIGS. 9 through 12.

At block 1820 the UE 115 may transmit during the second TTI or another TTI (e.g., a third TTI) according to the first TPC command and the assignment of resources. The other TTI (e.g., the third TTI) may follow the fourth TTI. The operations of block 1815 may be performed according to the methods described with reference to FIGS. 1 through 7. In certain examples, aspects of the operations of block 1815 may be performed by a TTI manager as described with reference to FIGS. 9 through 12.

Figure 19:
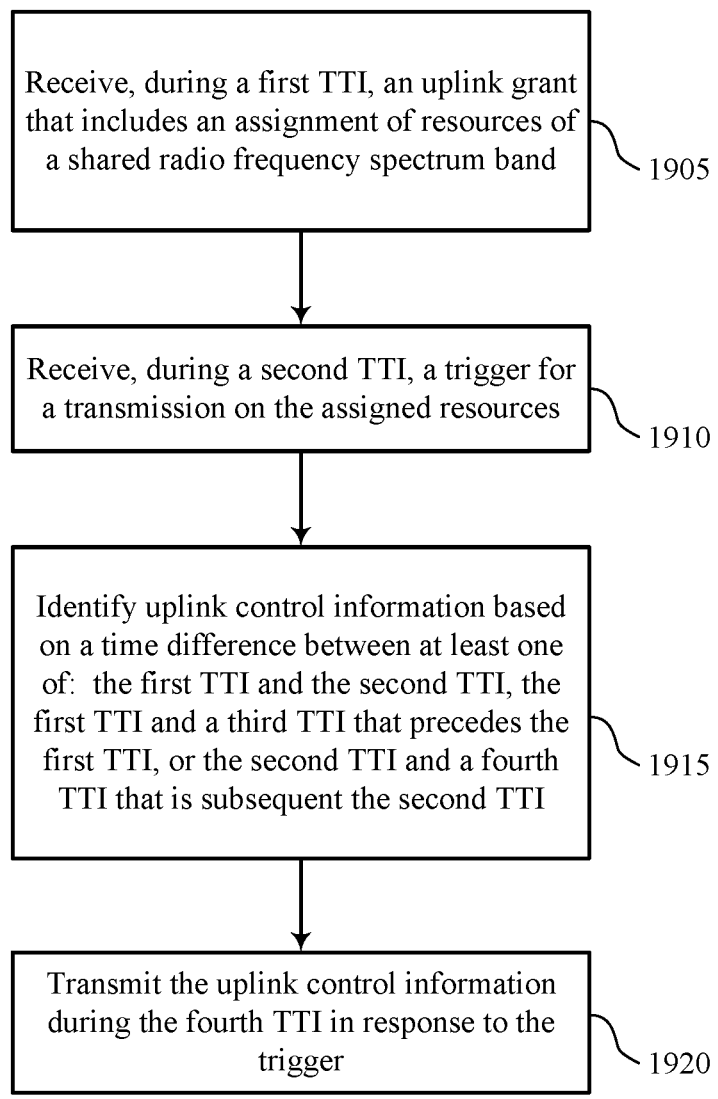

FIG. 19 shows a flowchart illustrating a method 1900 for power control, reporting techniques, and control channel configuration in a shared or unlicensed spectrum and licensed assisted access in accordance with various aspects of the present disclosure. The operations of method 1900 may be implemented by a UE 115 or its components as described herein. For example, the operations of method 1900 may be performed by a wireless communications manager as described with reference to FIGS. 9 through 12. In some examples, a UE 115 may execute a set of codes to control the functional elements of the device to perform the functions described below. Additionally or alternatively, the UE 115 may perform aspects of the functions described below using special-purpose hardware.

At block 1905 the UE 115 may receive, during a first TTI, a first uplink grant that includes an assignment of resources of a shared or an unlicensed radio frequency spectrum band. The operations of block 1905 may be performed according to the methods described with reference to FIGS. 1 through 7. In certain examples, aspects of the operations of block 1905 may be performed by a grant manager as described with reference to FIGS. 9 through 12.

At block 1910 the UE 115 may receive, during a second TTI, a trigger for a transmission on the assigned resources. The operations of block 1910 may be performed according to the methods described with reference to FIGS. 1 through 7. In certain examples, aspects of the operations of block 1910 may be performed by a trigger component as described with reference to FIGS. 9 through 12.

At block 1915 the UE 115 may identify uplink control information based at least in part on a time difference between at least one of: the first TTI and the second TTI, the first TTI and a third TTI that precedes the first TTI, or the second TTI and a fourth TTI that is subsequent to the second TTI. The operations of block 1915 may be performed according to the methods described with reference to FIGS. 1 through 7. In certain examples, aspects of the operations of block 1915 may be performed by a uplink control component as described with reference to FIGS. 9 through 12.

At block 1920 the UE 115 may transmit the uplink control information during the fourth TTI in response to the trigger. The operations of block 1920 may be performed according to the methods described with reference to FIGS. 1 through 7. In certain examples, aspects of the operations of block 1920 may be performed by a TTI manager as described with reference to FIGS. 9 through 12.

Figure 20:
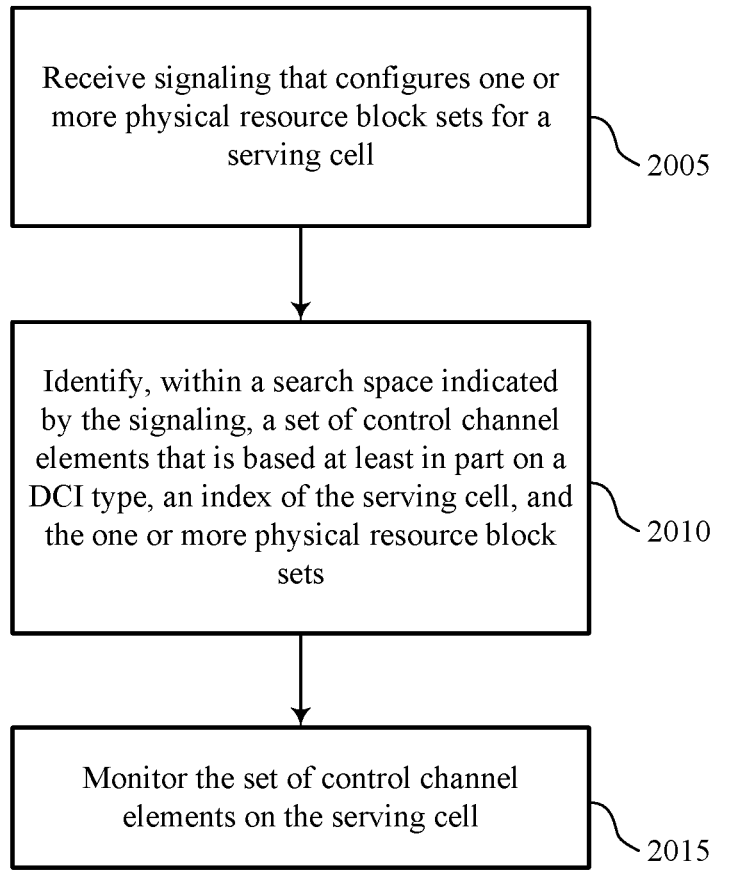

FIG. 20 shows a flowchart illustrating a method 2000 for power control and reporting techniques for two-stage grants in accordance with various aspects of the present disclosure. The operations of method 2000 may be implemented by a UE 115 or its components as described herein. For example, the operations of method 2000 may be performed by a UE wireless communications manager as described with reference to FIGS. 9 through 12. In some examples, a UE 115 may execute a set of codes to control the functional elements of the device to perform the functions described below. Additionally or alternatively, the UE 115 may perform aspects of the functions described below using special-purpose hardware.

At block 2005 the UE 115 may receive signaling that configures one or more physical resource block sets for a serving cell. The operations of block 2005 may be performed according to the methods described with reference to FIGS. 1 through 8. In certain examples, aspects of the operations of block 2005 may be performed by a signaling component as described with reference to FIGS. 9 through 12.

At block 2010 the UE 115 may identify, within a search space indicated by the signaling, a set of control channel elements that is based at least in part on a DCI type, an index of the serving cell, and the one or more physical resource block sets. The operations of block 2010 may be performed according to the methods described with reference to FIGS. 1 through 8. In certain examples, aspects of the operations of block 2010 may be performed by a search space component as described with reference to FIGS. 9 through 12.

At block 2015 the UE 115 may monitor the set of control channel elements on the serving cell. The operations of block 2015 may be performed according to the methods described with reference to FIGS. 1 through 8. In certain examples, aspects of the operations of block 2015 may be performed by a CCE manager as described with reference to FIGS. 9 through 12.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM).

An orthogonal frequency division multiple access (OFDMA) system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are releases of Universal Mobile Telecommunications System (UMTS) that use E-UTRA. UTRA, E-UTRA, UMTS, LTE, LTE-A, NR, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of evolved node B (eNBs) provide coverage for various geographical regions. For example, each eNB, gNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), next generation NodeB (gNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving, during a first transmission time interval (TTI), an uplink grant that includes an assignment of resources of a shared radio frequency spectrum band;
   receiving, during a second TTI, a trigger for a transmission on the assigned resources;

identifying, by the UE, content to include in uplink control information comprising channel state information (CSI) based at least in part on a time difference between at least one of: the first TTI and the second TTI, the first TTI and a third TTI that precedes the first TTI, or the second TTI and a fourth TTI that is subsequent the second TTI;

determining whether the time difference between the first TTI and the second TTI exceeds a threshold;

identifying a fifth TTI as a reference for the CSI when the time difference between the first TTI and the second TTI exceeds the threshold, wherein the fifth TTI precedes the second TTI, or identifying the third TTI as the reference for the CSI when the time difference between the first TTI and the second TTI is less than or equal to the threshold; and transmitting the uplink control information during the fourth TTI in response to the trigger.

2. The method of claim 1, further comprising:
identifying the third TTI as the reference for the CSI based at least in part on the time difference between the first TTI and the third TTI.

3. The method of claim 1, wherein the uplink control information comprises a power headroom report that is based at least in part on a signal within the fourth TTI.

4. The method of claim 1, wherein the uplink control information comprises a power headroom report that is based at least in part on a signal within the fifth TTI, wherein the fifth TTI is identified based at least in part on the time difference between the second TTI and the fourth TTI.

5. The method of claim 1, wherein the uplink control information comprises a buffer status report.

6. The method of claim 5, wherein the buffer status report is multiplexed with uplink data.

7. An apparatus for wireless communication at a user equipment (UE) comprising a processor, memory coupled to the processor, and instructions stored in the memory and operable, when executed by the processor, to cause the apparatus to:

receive, during a first transmission time interval (TTI), an uplink grant that includes an assignment of resources of a shared frequency spectrum band;

receive, during a second TTI, a trigger for a transmission on the assigned resources;

identify, by the UE, content to include in uplink control information comprising channel state information (CSI) based at least in part on a time difference between at least one of: the first TTI and the second TTI, the first TTI and a third TTI that precedes the first TTI, or the second TTI and a fourth TTI that is subsequent to the second TTI;

determine whether the time difference between the first TTI and the second TTI exceeds a threshold;

identify a fifth TTI as a reference for the CSI when the time difference between the first TTI and the second TTI exceeds the threshold, wherein the fifth TTI precedes the second TTI, or identify the third TTI as the reference for the CSI when the time difference between the first TTI and the second TTI is less than or equal to the threshold; and transmit the uplink control information during the fourth TTI in response to the trigger.

8. The apparatus of claim 7, wherein instructions are further executable to:
identify the third TTI as the reference for the CSI based at least in part on the time difference between the first TTI and the third TTI.

9. The apparatus of claim 7, wherein the uplink control information comprises a power headroom report that is based at least in part on a signal within the fourth TTI.

10. The apparatus of claim 7, wherein the uplink control information comprises a power headroom report that is based at least in part on a signal within the fifth TTI, wherein the fifth TTI is identified based at least in part on the time difference between the second TTI and the fourth TTI.

11. The apparatus of claim 7, wherein the uplink control information comprises a buffer status report.

12. The apparatus of claim 11, wherein the buffer status report is multiplexed with uplink data.

* * * * *